United States Patent
Riestra Pagola et al.

(10) Patent No.: US 12,243,358 B2
(45) Date of Patent: Mar. 4, 2025

(54) METHODS, APPARATUSES, AND STORAGE MEDIA TO TRACK ENGINE COMPONENTS

(71) Applicant: GENERAL ELECTRIC COMPANY, Schenectady, NY (US)

(72) Inventors: Luis Eduardo Riestra Pagola, Querétaro (MX); Stephen Davis, Eastleight (GB)

(73) Assignee: GENERAL ELECTRIC COMPANY, Evendale, OH (US)

( * ) Notice: Subject to any disclaimer, the term of this patent is extended or adjusted under 35 U.S.C. 154(b) by 451 days.

(21) Appl. No.: 17/504,193

(22) Filed: Oct. 18, 2021

(65) Prior Publication Data
US 2023/0118411 A1    Apr. 20, 2023

(51) Int. Cl.
G07C 5/00 (2006.01)
G07C 5/08 (2006.01)
H04W 4/80 (2018.01)

(52) U.S. Cl.
CPC ............ *G07C 5/008* (2013.01); *G07C 5/006* (2013.01); *G07C 5/0816* (2013.01); *H04W 4/80* (2018.02)

(58) Field of Classification Search
CPC ...... G07C 5/008; G07C 5/006; G07C 5/0816; H04W 4/80
See application file for complete search history.

(56) References Cited

U.S. PATENT DOCUMENTS

| | | | |
|---|---|---|---|
| 7,042,346 B2 | 5/2006 | Paulsen | |
| 7,551,086 B2 | 6/2009 | Coop et al. | |
| 7,855,663 B2 | 12/2010 | Wilbrink et al. | |
| 8,981,967 B1 * | 3/2015 | Shore | B64F 5/00 73/156 |

(Continued)

FOREIGN PATENT DOCUMENTS

| | | | | |
|---|---|---|---|---|
| EP | 2703297 B1 | 11/2015 | | |
| EP | 3483686 A1 * | 5/2019 | | G01P 13/02 |

(Continued)

OTHER PUBLICATIONS

European Patent Office, "Extended European Search Report", issued in connection with European Appl. No. 22196986, filed Feb. 27, 2023, 17 pages.

(Continued)

*Primary Examiner* — Yazan A Soofi
*Assistant Examiner* — Ahmed Alkirsh
(74) *Attorney, Agent, or Firm* — HANLEY, FLIGHT & ZIMMERMAN, LLC

(57) ABSTRACT

Methods, apparatuses, systems, and storage media to track engine components are disclosed. An example apparatus includes a memory; instructions in the apparatus; and processor circuitry to in response to a notification that an engine is undergoing maintenance or in operation, identify an entry in a database that corresponds to the engine, the engine including a module; update historical data corresponding to the module based on the notification; and determine whether the module of the engine has been replaced by extracting (Continued)

data from a data packet obtained via a wireless communication; and when the module of the engine has not been replaced, replace a first identifier of the module stored in the entry with a second identifier of the module and maintain the historical data for the module in the entry.

20 Claims, 12 Drawing Sheets

(56) References Cited

U.S. PATENT DOCUMENTS

| | | |
|---|---|---|
| 9,507,982 B2 | 11/2016 | Mylaraswamy et al. |
| 10,157,507 B2 | 12/2018 | Kumar et al. |
| 10,430,754 B2 | 10/2019 | Amann |
| 10,489,991 B2 | 11/2019 | Griffith et al. |
| 10,649,683 B2 | 5/2020 | Kao et al. |
| 2012/0027574 A1* | 2/2012 | Belanger ............. F01D 11/12 29/888.021 |
| 2014/0236450 A1 | 8/2014 | Care |
| 2018/0297718 A1 | 10/2018 | Adibhatla |
| 2018/0341794 A1 | 11/2018 | Balasubramanian et al. |
| 2019/0147411 A1* | 5/2019 | John ................. F01D 21/003 705/305 |
| 2020/0279214 A1* | 9/2020 | Hochman ............ G06F 16/248 |
| 2023/0118411 A1* | 4/2023 | Riestra Pagola ....... H04W 4/80 701/31.4 |

FOREIGN PATENT DOCUMENTS

| | | | | |
|---|---|---|---|---|
| EP | 4167162 A1 * | 4/2023 | ............ | G06Q 10/20 |
| JP | 2008097482 | 4/2008 | | |
| JP | 2014028687 A * | 2/2014 | | |
| WO | 2019096671 | 5/2019 | | |
| WO | WO-2020180798 A1 * | 9/2020 | ............... | B64F 5/60 |

OTHER PUBLICATIONS

European Patent Office, "Communication pursuant to Rule 69 EPC", issued in connection with European Appl. No. 22196986, filed Apr. 24, 2023, 2 pages.

* cited by examiner

METHODS, APPARATUSES, AND STORAGE MEDIA TO TRACK ENGINE COMPONENTS

FIELD OF THE DISCLOSURE

This disclosure relates generally to turbine engines and, more particularly, to methods, apparatuses, and storage media to track engine components.

BACKGROUND

In recent years, turbine engines have been increasingly utilized in a variety of applications and fields. Turbine engines are intricate machines with extensive availability, reliability, and serviceability requirements. Turbine engines include rotors with fan blades. The rotor and fan blades rotate at high speed and subsequently compress the air flow. The high-pressure compressor then feeds the pressurized air flow to a combustion chamber to generate a high-temperature, high-pressure gas stream. One characteristic of a rotor is balance. The balance of the rotor corresponds to the location of the center of mass of the rotor with respect to the geometric center of the rotor. The closer the center of mass is to the geometric center, the more balanced the rotor is. During implementation, balanced rotors have less vibration than unbalanced rotors, thereby leading to less probability of damage or error, larger lifespan, etc. During manufacturing and/or maintenance, different components (e.g., modules) of a turbine engine may be detached and worked on and/or replaced in the same or a different turbine engine.

Figure 1:
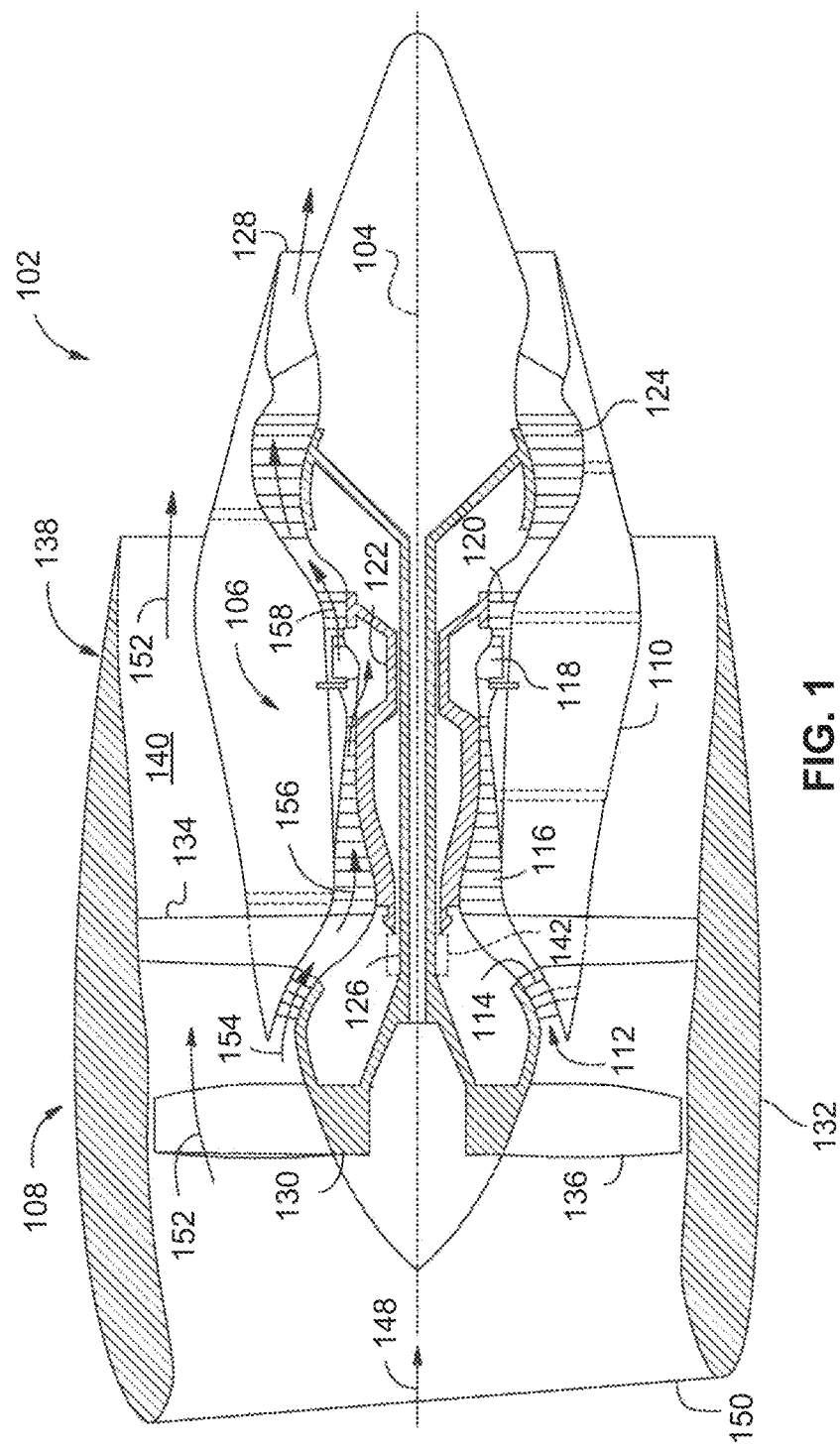
FIG. 1 illustrates an example gas turbine engine that can be utilized within an aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a rotor that includes fans. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades (e.g., fans) attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel, in some examples, burns at temperatures of more than 2000 degrees Fahrenheit. The resulting combustion produces a high-temperature, high-pressure gas stream (e.g., hot combustion gas) that passes through another group of blades called a turbine. In some examples, a turbine includes an intricate array of alternating rotating rotors and stationary airfoil-section rotors. Alternatively, the turbine can be structured with adjacent rotating rotors or stationary airfoil section rotors, or in any combination of alternating or adjacent airfoil-section blades. As the hot combustion gas passes through the turbine, the hot combustion gas expands, causing rotating blades of the rotating rotors to spin. The rotating blades of the rotating rotors serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

When a gas turbine engine is created, generally the different modules (e.g., system, sub-system, section, parts, components, sections and/or line replaceable units (LRUs)) are created at different locations (e.g., within the same facility or at different facilities). A LRU is a component that is designed to be easily removed, inspected, and/or replaced for maintenance purposes. In some examples, old or recycled parts, modules, components, LRUs, etc. may be used in part of a new gas turbine engine. Additionally, when a gas turbine engine goes through scheduled or non-scheduled maintenance and/or inspection, the parts, modules, components, LRUs, etc. of the gas turbine engine may be disassembled and move to different locations for inspection and/or maintenance. To be able to track the individual parts and/or components of an engine before the engine is assembled and/or while the engine is disassembled, an identifier may be placed and/or marked on the modules of the gas turbine engine (e.g., a serial number). However, tracking parts electronically by serial number can lead to user error (e.g., entering the wrong serial number), thereby causing inaccurate engine module information. Such inaccurate information can potentially be dangerous. For example, if a user enters an incorrect serial number that is used to track when a module is to be replaced, a module that does not comply the safety standards may inadvertently be used in an airplane.

Radiofrequency identification (RFID) tags are used to track components easily, quickly, and more accurately. For example, RFID tags can be placed on items to be tracked, and a scanner can scan the RFID tags to track the items based on a response from the RFID tag. Additionally, the RFID tag may store static information (e.g., parts list, etc.), manufacturer information, maintenance information (e.g., how to inspect, maintain, and/or replace a part), etc.) and/or historical information (e.g., flight history information, inspection history information, maintenance history information, etc.) so that the information corresponding to the gas turbine engine and/or individual modules of the gas turbine engine can be tracked. However, some of the modules of a gas turbine engine (e.g., limited life parts (LLPs)) are exposed to extremely high temperatures and/or pressures, which damage the RFID tags and/or any other electronic tracking components placed therein. Accordingly, placing an RFID tag on modules that are exposed to high temperatures and/or sufficient pressure will not be functional to track the modules after a single flight.

Examples disclosed herein provide a cloud-based technique for tracking turbine engines and/or components, parts, modules, LRUs, and/or LLPs of turbine engines using RFID tags, regardless of where the RFID tag is placed (e.g., in high temperature modules or low temperature modules). Although examples disclosed herein are described in conjunction with RFID technology, examples disclosed herein may be utilized with any type of wireless protocol technology (e.g., near field communication (NFC), Bluetooth low energy (BLE), Wi-Fi, etc.). Examples disclosed herein integrate RFID tags with LRUs, bar codes, markings, embedded sensor technologies, etc. for modules that are exposed to high temperature or low temperature. Examples disclosed herein track part information included identifiers, serial numbers, supplier information, manufacturer information, parts list, timestamps, maintenance data, historical data (e.g., number of flight, hours of use, number and/or type of maintenance/inspection, etc.), etc. to contribute to a flexible system that can respond to unknown field issues more efficiently and to provide near real-time information on the components in a fleet of planes. Accordingly, data are retrieved from a data lake available and associated to a tracked part of interest. Using examples disclosed herein, engine parts (e.g., including high temperature parts) can be tracked, located, monitored, etc. at any point in time using a cloud based approach to ease engine part maintenance, scheduling, improve manufacturing and maintenance efficiency, etc., resulting in a more efficient and safer use of gas turbine engines.

FIG. 1 is a schematic illustration of an example gas turbine engine 102. The example gas turbine engine 102 includes an example core gas turbine engine 106, an example fan section (e.g., also referred to as a fan, a booster, or booster module) 108, an example outer casing 110, an example annular inlet 112, an example booster compressor module 114, an example high-pressure, multi-stage, axial-flow compressor module (e.g., also referred to as a multi-stage compressor, a high pressure chamber, a high pressure compressor module, a high pressure module, and/or an axial-flow compressor) 116, an example combustor module 118, a first example turbine module 120, a first example drive shaft 122, a second example turbine module 124, a second example drive shaft 126, an example exhaust nozzle 128, an example axial-flow fan rotor assembly 130, an example annular fan casing 132, example guide vanes 134, example fan rotor blades 136, an example downstream section 138, an example airflow conduit 140, an example speed reduction device 142, an example inlet 150, and example combustion products 158.

FIG. 1 is a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. As used herein, the terms "axial" and "longitudinal" both refer to a direction parallel to the centerline axis 104, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by an arrow 148 in FIG. 1. These directional terms are used merely for convenience in description and do not require a particular orientation of the structures described thereby. The example centerline axis 104 represents the geometric center of rotors (e.g., including the example rotor assembly 130).

The engine 102 of FIG. 1 includes the core gas turbine engine 106 and the fan section 108 positioned upstream thereof. The core gas turbine engine 106 can generally include the substantially tubular outer casing 110 that defines an annular inlet 112. In addition, the outer casing 110 can further enclose and support the booster compressor 114 (e.g., also referred to a booster module or booster compressor module) for increasing the pressure of the air that enters the core gas turbine engine 106 to a first pressure level. The high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to the combustor 118 within which fuel is injected into the flow of pressurized air, with the resulting mixture being combusted within the combustor 118. The high-energy combustion products are directed from the combustor 118 along the hot gas path of the engine 102 to the first (high-pressure) turbine 120 for driving the high-pressure compressor 116 via the first (high-pressure) drive shaft 122, and then to the second (low-pressure) turbine 124 for driving the booster compressor 114 and fan section 108 via the second (low-pressure) drive shaft 126 that is generally coaxial with first drive shaft 122. After driving each of the turbines 120 and 124, the combustion products can be expelled from the core gas turbine engine 106 via the exhaust nozzle 128 to provide propulsive jet thrust.

In some examples, each of the compressor modules 114, 116 can include a plurality of compressor stages, with each stage including both an annular array of stationary compressor vanes and an annular array of rotating compressor blades (e.g., rotors that are part of the compressor) positioned immediately upstream of the compressor vanes. Similarly, each of the turbines 120, 124 can include a plurality of turbine stages, each stage including both an annular array of stationary nozzle vanes and an annular array of rotating turbine blades positioned immediately downstream of the nozzle vanes.

Additionally, as shown in FIG. 1, the fan section 108 of the engine 102 can generally include the rotatable, axial-flow fan rotor assembly 130 (e.g., also referred to as rotor) that is configured to be surrounded by the annular fan casing 132. The fan casing 132 can be configured to be supported relative to the core gas turbine engine 106 by the plurality of substantially radially-extending, circumferentially-spaced outlet guide vanes 134. As such, the fan casing 132 can enclose the fan rotor assembly 130 and its corresponding fan rotor blades 136. Moreover, the downstream section 138 of the fan casing 132 can extend over an outer portion of the core gas turbine engine 106 to define the secondary, or by-pass, airflow conduit 140 that provides additional propulsive jet thrust. A detailed example of the fan rotor blades 136 is further described below in conjunction with FIG. 2.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via the speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

During operation of the engine 102, an initial air flow (indicated by arrow 148) can enter the engine 102 through the associated inlet 150 of the fan casing 132. The air flow 148 then passes through the fan rotor blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

Figure 2:
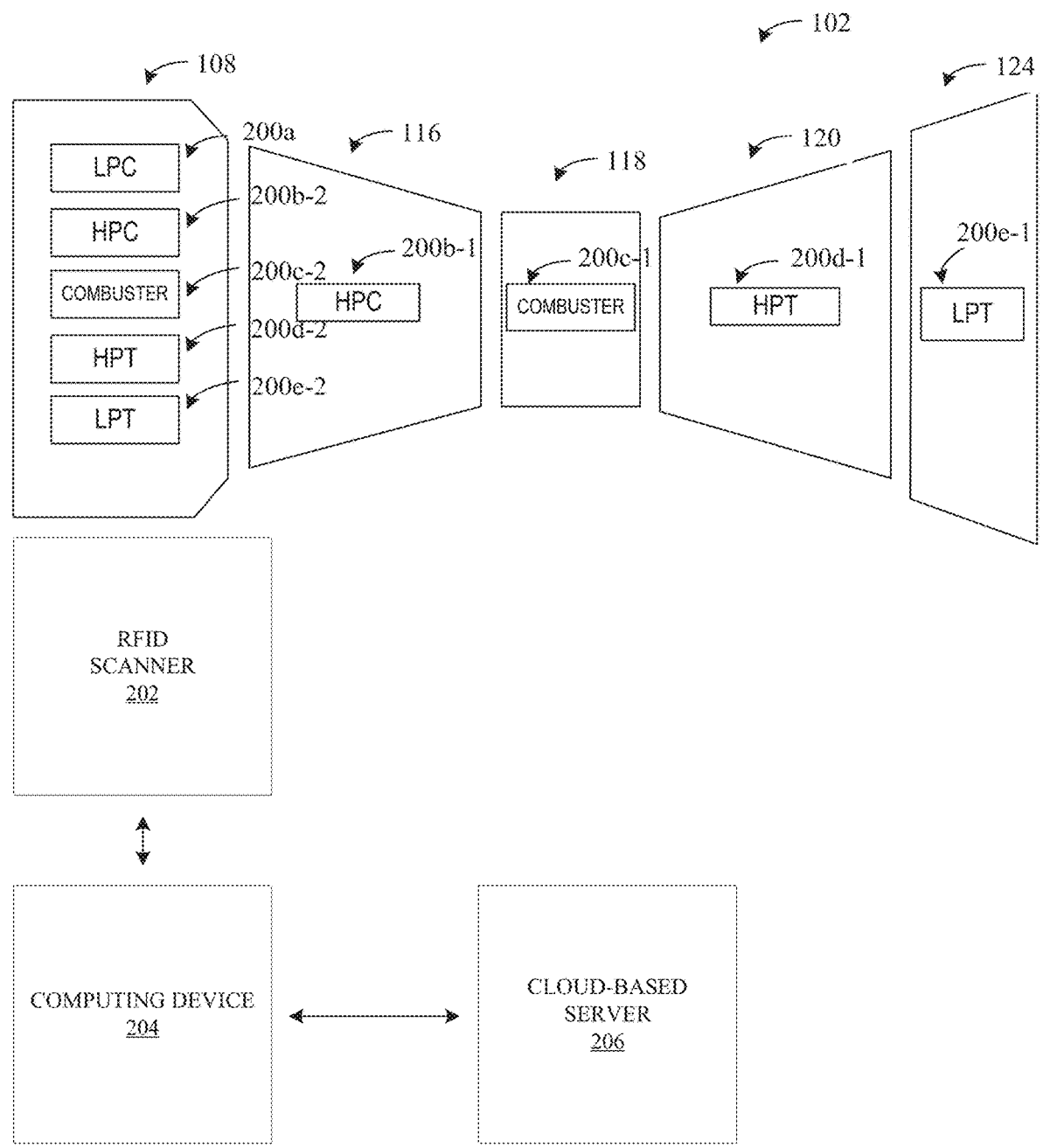
FIG. 2 illustrates an example system to track parts of the gas turbine engine of FIG. 1.

FIG. 2 illustrates a system for tracking the example engine 102 of FIG. 1. The example engine 102 includes the example fan section 108 (e.g., the low pressure), the example high pressure chamber 116, the example combustor 118, the example high pressure turbine 120, and the example low pressure turbine 124 of FIG. 1. FIG. 2 further includes RFID tags 200*a*, 200*b*-1, 200*b*-2, 200*c*-1, 200*c*-2, 200*d*-1, 200*d*-2, 200*e*-1, 200*e*-2, an example RFID scanner 202, an example computing device 204, and an example cloud-based server 206.

The example RFID tags 200*a*, 200*b*-1, 200*b*-2, 200*c*-1, 200*c*-2, 200*d*-1, 200*d*-2, 200*e*-1, 200*e*-2 of FIG. 2 are RFID tags that include one or more identifiers (e.g., unique identifier (UID), serial number, etc.). The RFID tags 200*a*, 200*b*-1, 200*c*-1, 200*d*-1, 200*e*-1 are placed in/on each of the modules 116, 118, 120, 124. The duplicate tags 200*b*-2, 200*c*-2, 200*d*-2, 200*e*-2 placed on and/or in the fan or booster 108 store the one or more identifiers of the corresponding tags 200*b*-*e* on the respective modules 116, 118, 120, 124. The tags 200*a*, 200*b*-1, 200*b*-2, 200*c*-1, 200*c*-2, 200*d*-1, 200*d*-2, 200*e*-1, 200*e*-2 may also store other information, such as static information, parts list, manufacture information, maintenance information, etc. Although the tags 200*a*, 200*b*-1, 200*b*-2, 200*c*-1, 200*c*-2, 200*d*-1, 200*d*-2, 200*e*-1, 200*e*-2, may not store other information, such as static information, parts list, manufacture information, maintenance information, etc., when a technician scans the RFID tags 200*a*, 200*b*-2, 200*c*-2, 200*d*-2, 200*e*-2, the technician can become aware of the information corresponding to the engine 102 via the cloud-based server 206 to help the technician perform the inspection and/or maintenance. For example, after the technician scans the RFID tags 200*a*, 200*b*-2, 200*c*-2, 200*d*-2, 200*e*-2, the computing device 204 can send the identification information corresponding to the engine 102 and/or modules 108, 116, 118, 120, 124 to the example cloud-based server 206 to determine the information corresponding to the engine 102 and provide this information back to the computing device 204 so that the technician can use the information for service and/or maintenance. Although the example tags 200*a*, 200*b*-1, 200*b*-2, 200*c*-1, 200*c*-2, 200*d*-1, 200*d*-2, 200*e*-1, 200*e*-2 are RFID tags, the tags may be implemented with any type of wired or wireless communication protocol (e.g., NFC, BLE, Wi-Fi, etc.).

During assembly of the example engine 102 of FIG. 2, the different modules of the engine (e.g., modules 108, 116, 118, 120, 124) are put together by one or more machines and/or technicians. During the assembly process, the one or more machines and/or technicians place the RFID tags 200*a*-*e* on/in each of the modules 108, 116, 118, 120, 124. Additionally, the one or more machines and/or technicians place duplicate RFID tags 200*b*-*e* on/in the example fan section 108. Because the modules 116, 118, 120, 124 are high temperature modules, the corresponding tags 200*b*-200*e* will likely become destroyed after one or more flights. Accordingly, the duplicate tags 200*b*-*e* are placed in the lower temperature module 108 so that after a flight, a technician can scan the duplicate tags to identify the corresponding high temperature modules. After each flight, during maintenance and/or during inspection, the modules 108, 116, 118, 120, 124 may be disassembled and moved to different locations. To track the modules 108, 116, 118, 120, 124 while disassembled, one or more machines and/or technicians will replace the damaged RFID tags 200*a*-200*e* on the high temperature modules and replace the duplicate tags on the fan or booster module 108 so that the module 108 can continue to include tags corresponding to each module of the engine 102. Additionally, some modules may be due for replacement after a threshold number of flights and/or hours in operation. However, if the RFID tags 200*b*-200*e* are being replaced after one or more flights, during maintenance, during inspection, etc., the identifier of the corresponding module is likewise constantly changing. Accordingly, the example cloud-based server 206 tracks and maintains a history of the engine 102 and/or the individual modules 108, 116, 118, 120, 124 based on the ever changing identifiers of the tags 200*a*-200*e* and/or change of modules, as further described below. The example cloud-based server 206 monitors the changing parts or assembly in conjunction with changing identifiers as a transactional change. Accordingly, the cloud-based server 206 can track the history of an engine and the parts therein as a blockchain and/or other distributed ledger.

The RFID scanner 202 of FIG. 2 scans the tags 200*a*, 200*b*-1, 200*b*-2, 200*c*-1, 200*c*-2, 200*d*-1, 200*d*-2, 200*e*-1, 200*e*-2 on the example engine 102 as part of assembly, maintenance, and/or inspection. The example RFID scanner 202 outputs an electromagnetic field that powers the tags 200*a*, 200*b*-1, 200*b*-2, 200*c*-1, 200*c*-2, 200*d*-1, 200*d*-2, 200*e*-1, 200*e*-2 via an antenna to cause the tags 200*a*, 200*b*-1, 200*b*-2, 200*c*-1, 200*c*-2, 200*d*-1, 200*d*-2, 200*e*-1, 200*e*-2 to output information (e.g., the one or more identifiers) back to the RFID scanner 202. A machine and/or a technician RFID scanner 202 may scan the tags to identify what parts are in the engine 102 and/or to obtain new identifiers (e.g., when a tag or module is replaced) that can be sent to the cloud-based server 206. The example RFID scanner 202 transmits the obtained information from the one or more tags 200*a*, 200*b*-1, 200*b*-2, 200*c*-1, 200*c*-2, 200*d*-1, 200*d*-2, 200*e*-1, 200*e*-2 to the example computing device 204 (e.g., via a wired or wireless communication).

The example computing device 204 of FIG. 2 provides instructions and/or recommendations regarding the assembly, inspection, and/or maintenance of the engine 102. For example, the computing device 204 includes a user interface to guide the technician on the steps needed for the cloud-based server 206 to be able to track the engine 102 and the corresponding modules 108, 116, 118, 120, 124 in near real time. During assembly, the computing device 204 gathers the information related to the engine 102, the modules 108, 116, 118, 120, 124, and the tag information and transmits the data to the cloud-based server 206. During maintenance, the computing device 204 may identify parts of the engine 102 to be inspected, replaced, etc. Additionally, the computing device facilitates the placement of one or more new RFID tags in the modules 116, 118, 120, 124 and/or duplicate RFID tags in the fan or booster module 108 (e.g., because one or more of the RFID tags 200*b*-1-200*e*-1 have been damaged). After modules and/or RFID tags are replaced during maintenance, the computing device 204 uses the RFID scanner 202 to scan the new RFID tags to provide the updated identifiers and/or updating module information to the example cloud-based server 206. The example computing device 204 can be a computer, mobile phone, a tablet, and/or any other type of computing device. The example computing device 204 is further described below in conjunction with FIG. 3.

The example cloud-based server 206 of FIG. 2 tracks the example engine 102 and the modules 108, 116, 118, 120, 124 via the ever changing RFID tags 200*a*, 200*b*-1, 200*b*-2, 200*c*-1, 200*c*-2, 200*d*-1, 200*d*-2, 200*e*-1, 200*e*-2 that are placed on/in the one or more modules 108, 116, 118, 120, 124. For example, at assembly, the cloud-based server 206 obtains information (e.g., via a wired or wireless communication) related to the engine 102 and the modules 108, 116, 118, 120, 124 that make up the engine 102 (e.g., RFID identifiers, maintenance information, maintenance history information, manufacturer information, flight information, etc.) and generates an entry in a database that identifies the engine 102 with the modules 108, 116, 118, 120, 124, the identifiers of the RFID tags 200a, 200b-1, 200b-2, 200c-1, 200c-2, 200d-1, 200d-2, 200e-1, 200e-2 and any corresponding information (e.g., maintenance information corresponding to the modules 108, 116, 118, 120, 124, maintenance history of the to the modules 108, 116, 118, 120, 124, parts lists for the to the modules 108, 116, 118, 120, 124, flight history of the to the modules 108, 116, 118, 120, 124, location of the engine 102, etc.). During maintenance, the RFID scanner 202 scans the RFID tag(s) of the engine 102 to identify the engine 102 and the parts of the engine entering maintenance. For any module that is replaced during maintenance (e.g., due to be used for more than a threshold number of flights and/or due to inspection), the cloud-based server 206 receives an indication that the module has been replaced and updates the entry for the engine 102 to remove the identifier, maintenance data, history (e.g., number of flights, number of maintenance, hours of use, etc.), and any other static data from the database and creates a new entry based on the new module with a new RFID tag. In some examples, the cloud-based server 206 provides an alert to the computing device 204 to inform the computing device 204 that one or more of the modules should be inspected and/or replaced based on the maintenance records, history, etc. If a module is not replaced, but the RFID tag is replaced, the cloud-based server 206 obtains an indication of the new RFID tag and finds the entry corresponding to the module and removes the prior identifier(s) for the module and adds new identifier(s) corresponding to the new RFID tag while maintaining the maintenance data, history data, and/or any other static data (e.g., because the module is the same but the identifier has changed). Thus, the cloud-based server 206 can store real-time information related to engines, individual modules of engines, and the information corresponding to the engine and/or modules of the engine. The example cloud-based server 206 is further described below in conjunction with FIG. 3.

Figure 3:
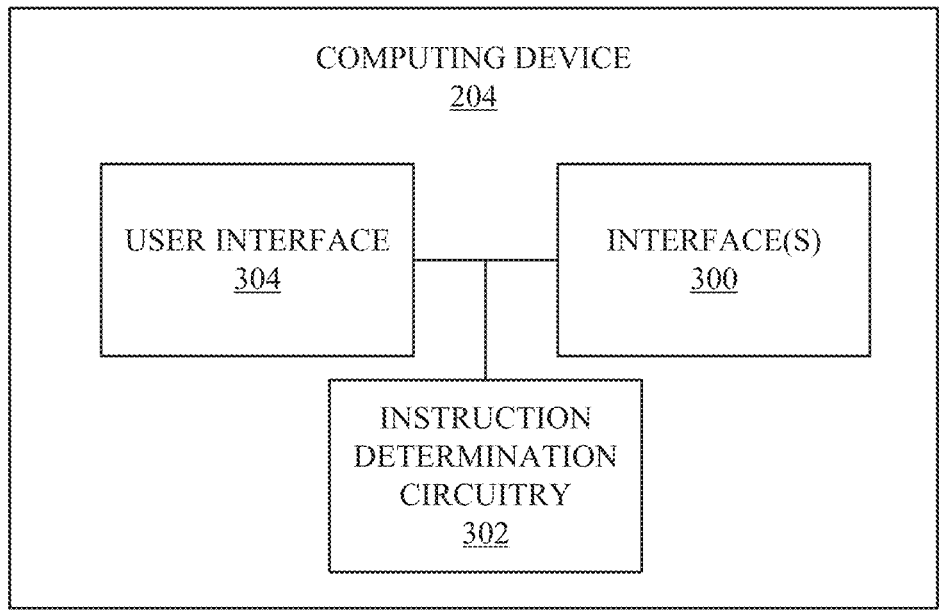
FIG. 3 is a block diagram of the example computing device and the example cloud-based server of FIG. 2.
Figure 3:
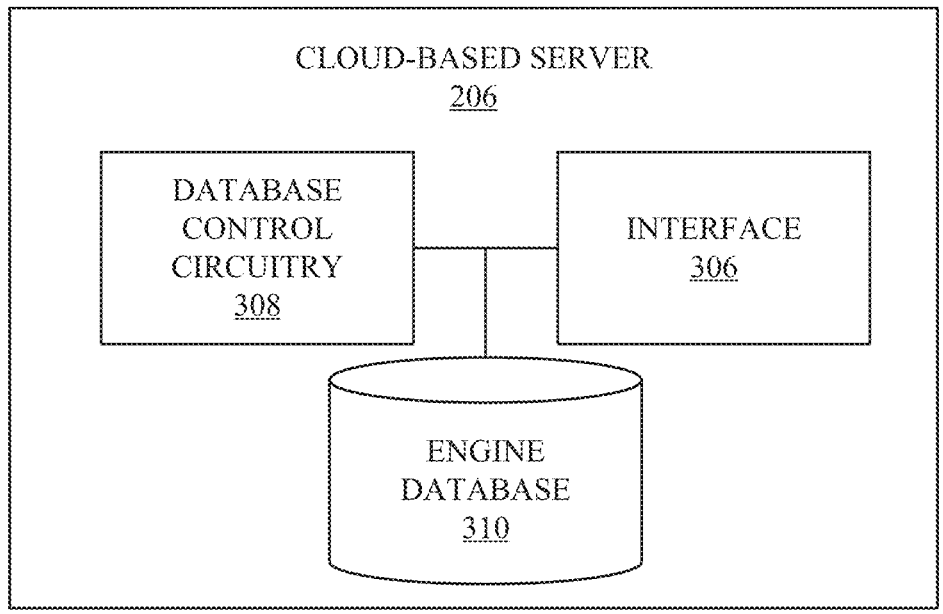

FIG. 3 is a block diagram of the example computing device 204 and the example cloud-based server 206 of FIG. 2. The example computing device 204 includes an example interface(S) 300, an example instruction determination circuitry 302, and an example user interface 304. The example cloud-based server 206 includes an interface 306, an example database control circuitry 308, and an example engine database 310.

The example interface(s) 300 of FIG. 3 obtain information from the RFID tags 200a-200e-2 via the example RFID scanner 202. For example, the interface(s) 300 obtains RFID tag identifiers for the modules of the engine 102 along with any information obtained or determined by the computing device 204. Additionally, the example interface(s) 300 transmits and/or receives information from the example cloud-based server 206. For example, the interface(s) 300 may transmit information corresponding to the RFID in conjunction with the engine 102 to the example cloud-based server 206. Additionally, the interface(s) 300 may obtain information from the cloud-based server 206 such as maintenance history, flight history, etc. for each module. The computing device 204 can use the maintenance history, flight history, etc. to determine how to perform maintenance on the corresponding module and/or whether to replace the corresponding module. For example, if a particular module should be replaced after 50 flights, the cloud-based server 206 may determine if the module has reached the 50 flights and send an indication that the module is to be replaced to the example computing device 204 via the interface(s) 300. The interface(s) 300 may be one interface to communicate with the RFID scanner 202 and the cloud-based server 206. In some examples, the interface(s) 300 may be one interface to communicate with the RFID scanner 202 and one interface to communicate with the cloud-based server 206.

The example instruction determination circuitry 302 of FIG. 3 determines which instructions to display to the technician based on the context of a scan. For example, during assembly, the instruction determination circuitry 302 can develop instructions to inspect and scan new and/or used parts of the engine 102, write the scanned information in an RFID tag, place the RFID tags on the corresponding modules 108, 116, 118, 120, 124 of the engine 102, copy the RFID tags on the high temperature modules 116, 118, 120, 124 to the fan or booster module 108, and scan the RFID tags on the fan or booster modules 108. During maintenance, the example instruction determination circuitry 302 can scan or develop instructions to scan an incoming engine 102, disable and/or inspect the module(s) 108, 116, 118, 120, 124, replace unserviceable module RFID tags, scan unserviceable modules, scan replacement parts, and place new RFID tags on new and/or existing modules. The example instruction determination circuitry 302 transmits the instructions to the example user interface 304.

The user interface 304 of FIG. 3 displays instructions and/or obtains feedback from the user. For example, the user interface 304 displays the instructions developed by the example instruction determination circuitry 302. The user interface 304 can wait for a confirmation that a particular instruction has been performed by the technician. Additionally, the user interface may question whether the technician would like to perform maintenance and/or replace a module based on the inspection of the user. The user interface 306 can include a screen, touchscreen, or other visual indicator, as well as a device to provide feedback to the instruction determination circuitry 302 (e.g., the touchscreen, a mouse, a keyboard, etc.).

The example interface 306 of FIG. 3 obtains information obtained by and/or determined by the example computing device 204. For example, the interface 306 can receive information stored in the RFID tags of the engine 102 to be able to generate a new entry (e.g., for a new assembly), track (for used modules), and/or update information corresponding to the engine 102 and/or the modules 108, 116, 118, 120, 124 of the engine 102. Additionally, the interface 306 transmits data to the example computing device 204. For example, the interface 306 may transmit the maintenance history and/or flight history for module(s) of a scanned engine to the computing device 204 and/or may transmit an indication that the module should be inspected/maintained in a particular way and/or replaced (e.g., based on a determination according to the maintenance protocol, maintenance history, and/or flight history). Although the example of FIGS. 2-3 illustrate a single computing device and a single cloud-based server, there may be multiple computing devices communicating with multiple cloud based servers.

The example database control circuitry 308 of FIG. 3 generates new entries corresponding to new engines and/or tracks and/or maintains information related to engines and/or modules of engines for a fleet of planes. For example, when a new engine is assembled, the database control circuitry 308 uses the engine and/or module information (e.g., including RFID identifiers) to create a new entry in the example engine database. The entry identifies the engine, the modules, identifiers of the corresponding RFID tags for the modules, information corresponding to the engine and/or modules (e.g., manufacturer, parts list, etc.), maintenance parameters for the individual modules (e.g., how to maintain/inspect, when to replace, etc.), maintenance history for the individual module(s) (e.g., initialized to null when new), flight history of the individual module(s) (e.g., number of flights, number of flight hours, etc., initialized to null when new), location of the engine, and/or a timestamp of when the engine was assembled and/or scanned. When the engine 102 is undergoing maintenance and/or inspection (e.g., after one or more flights), the module(s) can be inspected, worked on, and/or replaced. Additionally, the RFID tags in the high temperature modules are replaced during maintenance and/or inspection. Accordingly the identifier(s) linked to the module can change during every maintenance and/or inspection. Accordingly, when the engine 102 is undergoing maintenance, inspection, and/or during operation the identifier corresponding to the module(s) will change and the computing device 204 will provide the updated identifier(s). For modules(s) that are not replaced, the database control circuitry 308 replaced the old, out-of-date identifiers for the corresponding modules with new identifiers, while maintaining the data corresponding to the module (e.g., maintenance history, flight history, inspection history, timestamps, static data (e.g., manufacture information, parts list, maintenance information, etc.), etc.) If a module is replaced, the database control circuitry 308 removes and/or updates the data corresponding to the old module to data corresponding to a new module. For example, the maintenance history, flight history, inspection history, timestamps, static data, etc. for the old module is deleted and the maintenance history, flight history, inspection history, timestamps, static data, etc. for the new module is added to the entry. If the new module has never been used in an engine, the maintenance history, flight history, and/or timestamps may be initiated to a null value.

The example engine database 310 of FIG. 3 stores the obtained information from the example computing device 204. The engine database 310 can includes entries for every engine and/or module in operation in a fleet of planes. Thus, a processing device can access the engine database 310 to determine and/or generate a report including the location and/or status of every engine and/or every engine module across the fleet and identify maintenance history, upcoming module replacements, and/or any other information related to the engines of the fleet.

While an example manner of implementing the computing device 204 and/or the cloud-based server 206 of FIG. 2 is illustrated in FIG. 3, one or more of the elements, processes and/or devices illustrated in FIG. 3 may be combined, divided, re-arranged, omitted, eliminated and/or implemented in any other way. Further, the example interface 300, the example instruction determination circuitry 302, the example user interface 304, the example interface 306, the example database control circuitry 308, the example engine database 310, and/or, more generally, the example computing device 204 and/or the cloud-based server 206 of FIG. 3 may be implemented by hardware, software, firmware and/or any combination of hardware, software and/or firmware. Thus, for example, any of the example interface 300, the example instruction determination circuitry 302, the example user interface 304, the example interface 306, the example database control circuitry 308, the example engine database 310, and/or, more generally, the example computing device 204 and/or the cloud-based server 206 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 300, the example instruction determination circuitry 302, the example user interface 304, the example interface 306, the example database control circuitry 308, the example engine database 310, and/or, more generally, the example computing device 204 and/or the cloud-based server 206 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the computing device 204 and/or the cloud-based server 206 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the computing device 204 and/or the cloud-based server 206 of FIG. 3 are shown in FIGS. 4-8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 4-8, many other methods of implementing the computing device 204 and/or the cloud-based server 206 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
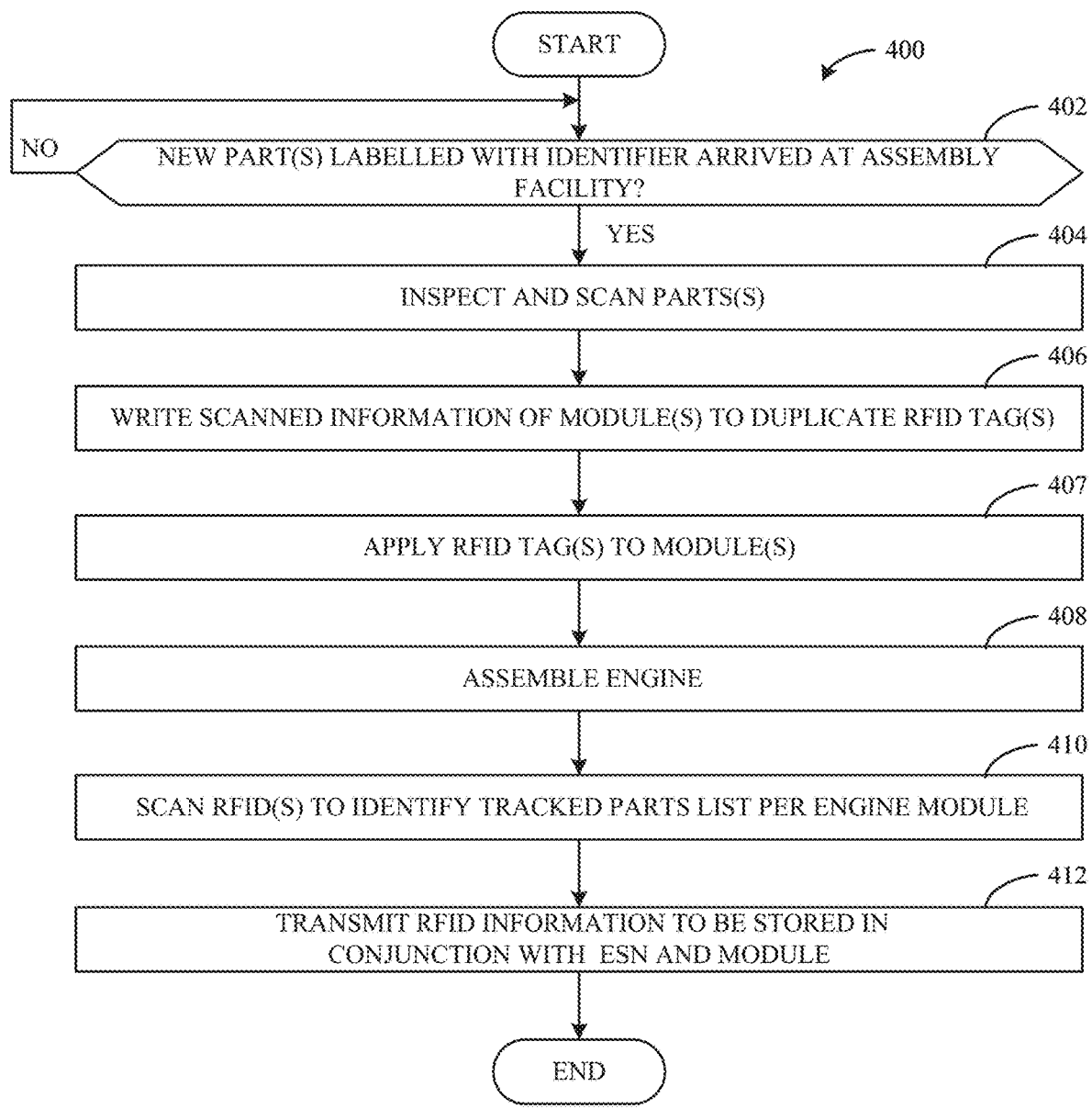
FIGS. 4-5 is a flowchart representative of example machine readable instructions that may be executed by example processor circuitry to implement the example computing device of FIG. 3.

FIG. 4 is a flowchart representative of example machine readable instructions 400 which may be executed to by the example computing device 204 to facilitate assembly of a new engine. Although the instructions 400 are described in conjunction with the computing device 204 and the engine 102 of FIGS. 1, 2 and/or 3, the instructions 400 may be described in conjunction with any type of computing device to track any type of device that includes modules exposed to high temperatures.

At block 402, the example instruction determination circuitry 302 determines if one or more new parts labelled with an identifier (e.g., serial number) has arrived at a facility. For example, when new parts for a new engine have arrived at the facility, the technician indicates that the new part(s) has/have arrived using the example user interface 304. If the example instruction determination circuitry 302 determines that a new part has not arrived (block 402: NO), control returns to block 402. If the example instruction determination circuitry 302 determines that a new part has arrived (block 402: YES), the example instruction determination circuitry 302 facilitates the inspection and scanning the part(s) of the engine 102 and/or the modules 108, 116, 118, 120, 124 via the user interface 304 (block 404). The engine 102 and/or the modules 108, 116, 118, 120, 124 can be scanned to identify serial numbers, identifiers, and/or any other information related to the engine 102 and/or the modules(s) 108, 116, 118, 120, 124 of the engine.

At block 406, the example instruction determination circuitry 302 writes the scanned information of part(s) of the RFID tag to duplicate RFID tag via the user interface 304. For example, any identification information of the parts and/or modules (e.g., identifiers of the RFID tags) can be written into duplicate RFID tag so that the information is stored in fan or booster 108 and can be read by a scanner at any point in time. For example, if the module that is being assembled is a high temperature module, the example instruction determination circuitry 302 instructs generation of a duplicate RFID tag that will be placed on the low-temperature fan or booster module 108. The duplicate RFID tag includes the same information as the RFID tag placed on the high temperature module.

At block 407, the example instruction determination circuitry 302 instructs application of the RFID tags to the corresponding modules of the engine 102 via the user interface 304. For example, the instruction determination circuitry 302 instructs the application of the RFID tag 200b-1 that corresponds to the module 116 in/on the example module 116. Additionally, the instruction determination circuitry 302 instructs application of the duplicate RFID tag 200b-2 that corresponds to the module 116 in/on the example fan or booster module 108. At block 408, the example instruction determination circuitry 302 instructs the assembly of the engine 102 via the user interface 304.

At block 410, the example instruction determination circuitry 302 scans the RFID tag(s) (e.g., using the RFID scanner 202) to identify and/or verify the tracked parts list per engine module (e.g., the modules of the engine 102) via the user interface 304. At block 412, the example interface 300 transmits the RFID information corresponding to the scan(s) of the RFID tag(s) and/or information obtained by the computing device 204 via entry from a technician (e.g., identifiers, manufacture information, maintenance information, flight history information, timestamps, and/or other static and/or historical information) to the example cloud-based server 206. In some examples, only the identifiers of the RFID tags are sent to the cloud-based server 206 and the cloud-based server 206 determines that other information based on the identifiers. As further described below, the cloud-based server 206 generates an entry in an engine database 310 to be able to track and monitor the engine 102 and/or the modules 108, 116, 118, 120, 124 that make up the engine 102.

Figure 5:
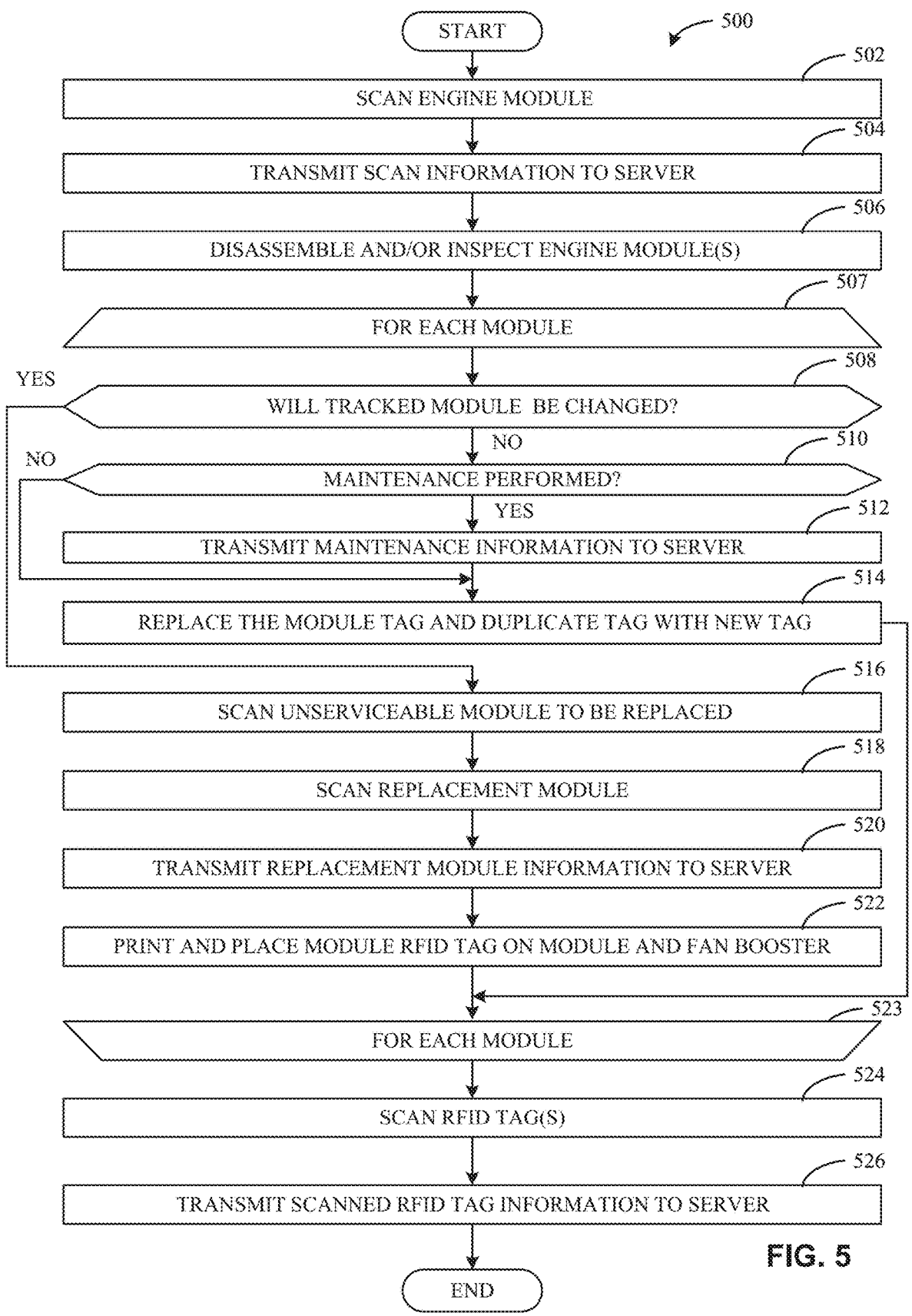

FIG. 5 is a flowchart representative of example machine readable instructions 500 which may be executed to by the example computing device 204 facilitates the performance of maintenance and/or inspection of an engine after flight by providing instructions and/or suggestions. Although the instructions 500 are described in conjunction with the computing device 204 and the engine 102 of FIGS. 1, 2 and/or 3, the instructions 500 may be described in conjunction with any type of computing device to track any type of device that includes modules exposed to high temperatures.

At block 502, the example instruction determination circuitry 302 scans the incoming engine 102 using the example RFID scanner 202 via the user interface 304. For example, the instruction determination circuitry 302 scans the RFID tags 200a, 200b-2, 200c-2, 200d-2, 200e-2 on the fan or booster module 108 using the RFID scanner 202 via the interface 300. At block 504, the example interface 300 transmits the scanned information (e.g., RFID identifiers) to the cloud-based server 206. As further described below, the example cloud-based server 206 updates the historic data (e.g., number of maintenance per module and/or engine, number of flights per module and/or the engine, flight hours per module and/or the engine, etc.) based on the transmitted scan information (e.g., identifiers).

At block 506, the example instruction determination circuitry 302 facilitates the disassembly and/or inspection the modules 108, 116, 118, 120, 124 of the engine 102 via the user interface 304. Accordingly, problems with one or more parts of the module(s) 108, 116, 118, 120, 124 that involve maintenance and/or replacement can be identified. For each module 108, 116, 118, 120, 124 (blocks 507-523), the instruction determination circuitry 302 determines if a tracked module will be replaced (block 508). For example, the instruction determination circuitry 302 can determine that a tracked module is to be replaced when the technician identifies (e.g., via the user interface 304) an issue that cannot be repaired according to one or more standards (e.g., safety standards). Additionally, the instruction determination circuitry 302 can determine that a track modules is to be replaced when the cloud-based server 206 indicates that the modules is to be replaced based on the maintenance information and the historic information. For example, if the maintenance information indicates that a module should be replaced after a threshold number of flights, a threshold number of hours of use, and/or after a threshold amount of time (e.g., X months since first implemented), the cloud-based server 206 may determine the history of the module to see if the module is due to be replaced based on the threshold(s). In some examples, the computing device 204 determines whether the thresholds of the modules are satisfied based on maintenance information and/or historic data obtained from the cloud-based server 206.

If the instruction determination circuitry 302 determines that a tracked module will be replaced (block 508: YES), control continues to block 516, as further described below. If the instruction determination circuitry 302 determines that a tracked module will not be replaced (block 508: NO), the example instructions determination circuitry 302 determines if maintenance for the module is to be performed (block 510). The example instruction determination circuitry 302 may determine if the maintenance for the module is to be performed based on feedback from the technician (e.g., via the user interface 304), the maintenance information, maintenance history, flight history, etc. (e.g., from the cloud-based server 206). For example, the maintenance information may indicate that particular maintenance is to be performed after a threshold number of flights and the instruction determination circuitry 302 may compare the history of the module to determine if the threshold is satisfied. If the example instructions determination circuitry 302 determines that maintenance for the module is not to be performed (block 510: NO), control continues to block 514.

If the example instructions determination circuitry 302 determines that maintenance for the module is to be performed (block 510: YES), the example interface 300 transmits the maintenance information to the example cloud-based server 206 (e.g., via a wired or wireless communication) (block 512). At block 514, the example instructions determination circuitry 302 facilitates replacement the unserviceable module tag (e.g., if implemented in a high temperature module or not functional) with a new module tag and a duplicate module tag in/on the fan or booster module 108, and control continues to block 523. If the instruction determination circuitry 302 determines that a tracked module will be replaced (block 508: YES), the example instruction determination circuitry 302 scans the RFID tag of the unserviceable module to be replaced using the example RFID scanner 202 (block 516). The RFID of the unserviceable module is scanned so that that computing device 204 can communicate (e.g., to the cloud-based server 206) which module is being replaced from the engine 102.

At block 518, the example instruction determination circuitry 302 scans the replacement module using the example RFID scanner 202 (e.g., for identifiers) so that the computing device 204 can identify the replacement module. At block 520, the example interface 300 transmits the scanned replacement module information to the cloud-based server 206. The replacement module information includes the identifier(s) of the module that was replaced and the information related to the replacement module. As further described below, the cloud-based sever 206 finds the entry for the replaced module in the engine database 310, deletes the information related to the replaced module and adds the information from the replacement module in the entry. Thus, the information for the engine 102 in the cloud-based server 206 remains up-to-date. At block 522, the example instruction determination circuitry 302 facilitates the printing and/or placement module RFID tag on the replacement module and a duplicate RFID tag (e.g., including the same information) on the fan or booster 108. The new RFID tag may include any identification information (e.g., UID, serial number, etc.)

At block 524, after the modules have been inspected, maintained, replaced, and/or reassembled in the example engine 102, the example instruction determination circuitry 302 scans the RFID tags of the example fan or booster and/or the modules using the example RFID scanner 202 to ensure that the correct module(s) are included in the correct engine (e.g., a final check). The example computing device 204 can verify that the RFID tags correspond to the expected modules for the engine 102. In some examples, the computing device 204 transmits the scanned information to the example cloud-based server 206 and the cloud based server verifies that the RFID tags correspond to the expected modules for the engine 102. Accordingly, at block 526, the example interface 300 transmits the scanned RFID tag information to the server 206.

Figure 6A:
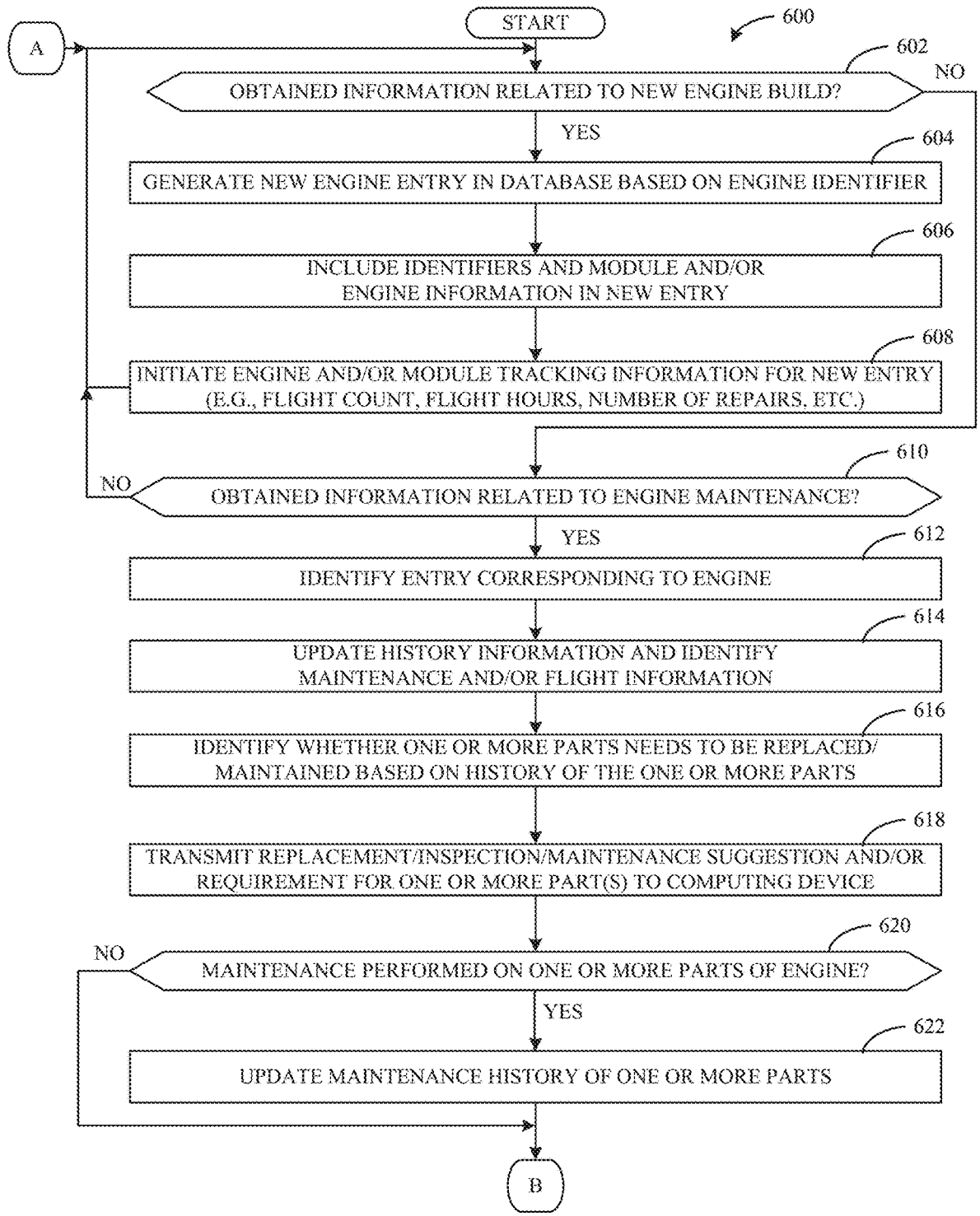
FIGS. 6A-6B is a flowchart representative of example machine readable instructions that may be executed by example processor circuitry to implement the example could-based server of FIG. 3.
Figure 6B:
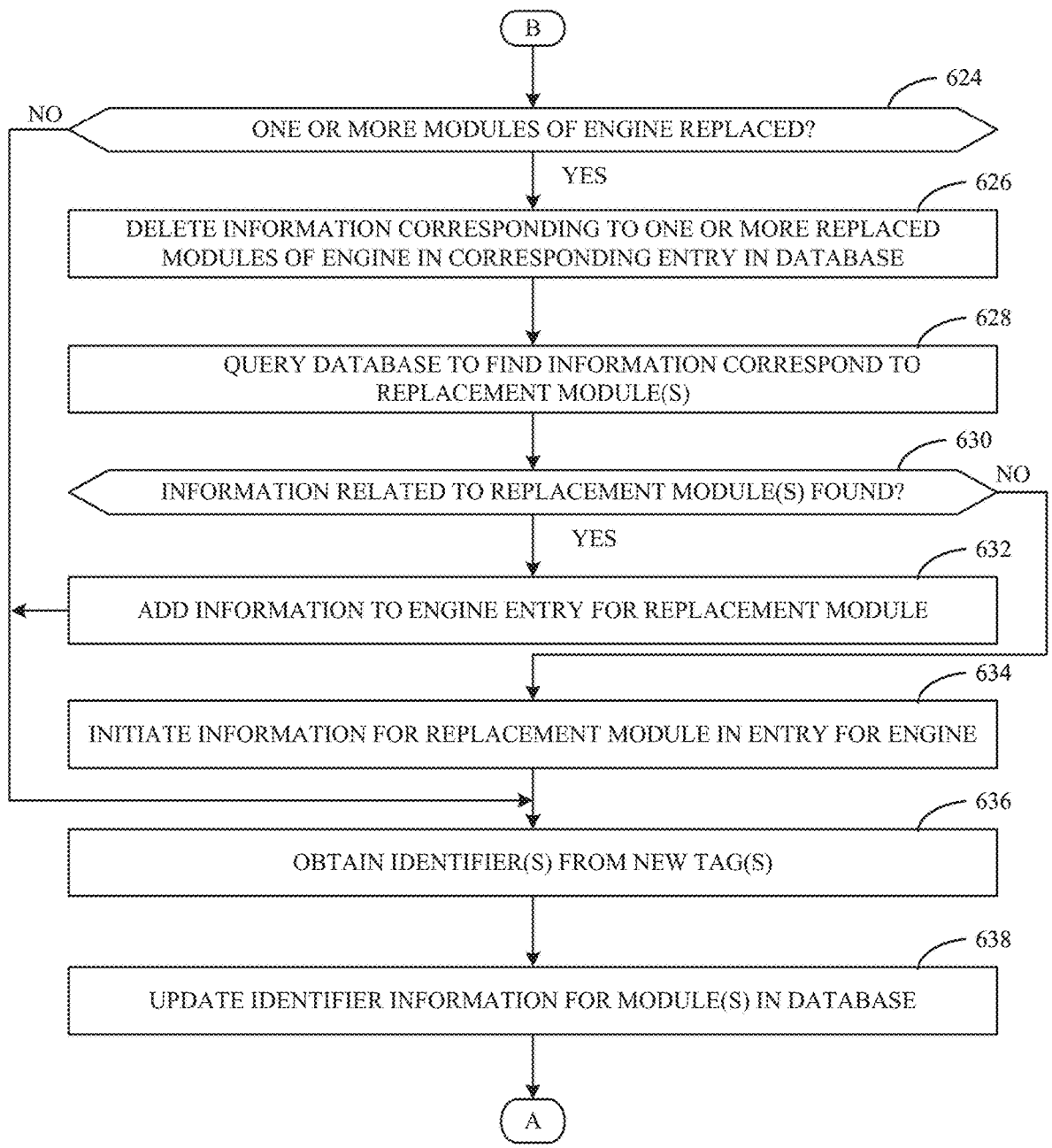

FIGS. 6A and 6B illustrate a flowchart representative of example machine readable instructions 600 which may be executed to by the example cloud-based server 206 of FIG. 3 to execute a track modules(s) for engines within a fleet of planes in the cloud. Although the instructions 600 are described in conjunction with the cloud based server 206 in the example environment of FIG. 2, the instructions 600 may be described in conjunction with any type of computing device in any type of environment.

At block 602, the example database control circuitry 308 determines information has been obtained related to a new engine build. For example, the database control circuitry 308 identifies if new information has been obtained from the interface 306. As described above, the computing device 204 transmits data related to a new engine build when a new engine is being and/or has been assembled. If the example database control circuitry 308 determines that the interface 306 has not obtained information related to a new engine (block 602: NO), control continues to block 610, as further described below. If the example database control circuitry 308 determines that the interface 306 has obtained information related to a new engine (block 602: YES), the example database control circuitry 208 generates a new engine entry in the example engine database 310 based on an engine identifier from the obtained information (block 604). At block 606, the example database control circuitry 308 fills the new entry using identifiers (e.g., the engine identifier, the module identifier(s), RFID identifier(s), etc.) module information (e.g., time stamp, age, manufacturer, initial test results, parts list, flight history, maintenance information, maintenance history, inspection history, etc.), engine information (e.g., type of plane the engine is implemented in, parts list for engine, types of modules that can be implemented in the engine, location, timestamp of assembly, etc.), etc. At block 608, the example database control circuitry 308 initiates any engine and/or module(s) tracking information for new entries to zero (e.g., if the corresponding module is new). For example, the database control circuitry 308 initiates the flight count, flight hours, number of maintenances/inspections, etc. for the engine and the new module(s) to zero. If one or more of the module(s) has previously been used, the cloud-based server 206 finds the corresponding data from the cloud-based server 206 and adds the data to the module entry for the new engine entry.

If the example database control circuitry 308 does not obtain information related to a new build (block 602: NO), the example database control circuitry 308 determines if the interface 306 obtained information related to engine maintenance via a wireless communication (block 610). As described above, after one or more flights, the engine 102 is inspected and/or undergoes maintenance by one or more technicians and/or machines. During the inspection and/or maintenance, the maintenance history, flight history, and/or inspection history for the engine 102 and/or the modules 108, 116, 118, 120, 124 of the engine 102 are updated at the cloud-based server 206 to provide an up-to-date history of the engine 102 and/or modules 108, 116, 118, 120, 124. If the example database control circuitry 308 determines that the interface 306 has not obtained information related to engine maintenance (block 610: NO), control returns to block 602. If the example database control circuitry 308 determines that the interface 306 obtained information related to engine maintenance (block 610: YES), the example database control circuitry 308 identifies an entry in the example database 310 that corresponds to one or more identifier(s) corresponding to the engine 102 from the obtained information (block 612). For example, the database control circuitry 308 may extract information from data packets obtained via a wireless communication and process the information to identify the one or more identifier(s) and/or any other obtained information corresponding to the engine 102.

At block 614, the example database control circuitry 308 updates the historic data for the engine 102 and/or the modules 108, 116, 118, 120, 124. For example, the maintenance data is for the engine 102 and/or the modules 108, 116, 118, 120, 124 is updated to correspond to the current maintenance/inspection (e.g., increment the number of maintenances/inspections, increment the flight count, etc.). At block 616, the example database control circuitry 308 determines whether one or more parts are to be replaced and/or maintained based on the historic data and maintenance information. In some examples, the maintenance information may mandate and/or suggest that a particular part is to have particular maintenance performed after a threshold number of flights and/or inspections. In some examples, the maintenance information may mandate that a module is to be replaced after a threshold number of flights, inspections, and/or maintenances. Accordingly, the database control circuitry 308 uses the historic information and the maintenance information to determine whether a module and/or part is due to be inspected, maintained, and/or replaced.

At block 618, the example interface 306 transmits replacement, inspection, and/or maintenance suggestions and/or requirements for one or more parts of the engine 102 to the computing device 204. At block 620, the example database control circuitry 308 determines if maintenance has been performed on one or more parts and/or modules of the engine 102 (e.g., based on information sent from the example computing device 204). If the example database control circuitry 308 determines that maintenance has not been performed on one or more parts and/or modules of the engine 102 (block 620: NO), control continues to block 624 of FIG. 6B. If the example database control circuitry 308 determines that maintenance has been performed on one or more parts and/or modules of the engine 102 (block 620: YES), the example database control circuitry 208 updates the maintenance history of the engine 102 and/or one or more modules 108, 116, 118, 120, 124 based on the performed maintenance (block 622). For example, if maintenance is performed on the module 116, the database control circuitry 308 can update the entry for the module 116 to identify the maintenance, the parts maintenance, a timestamp for the maintenance, reason for the maintenance (e.g., threshold number of flights, results of inspection from the technician, etc.) and/or any other information related to the maintenance.

At block 624, the example database control circuitry 308 determines if one or more modules of the engine 102 were replaced during maintenance (e.g., based on information obtained via a wireless communication from the computing device 204). For example, the database control circuitry 308 extract data from data packets obtained via a wireless communication to determine whether the data includes an indication that one or more modules of the engine 102 was replaced. If the example database control circuitry 308 determines that one or more modules of the engine 102 was not replaced during maintenance (block 624: NO), control continues to block 630. If the example database control circuitry 308 determines that one or more modules of the engine 102 was replaced during maintenance (block 624: YES), the example database control circuitry 308 deletes the information corresponding to the module(s) that is/are being replaced (block 626). Because the module is being replaced, the information corresponding to the module is no longer relevant in the entry corresponding to the engine 102. In some examples, the information that is removed from the entry is stored in a different location in the engine database 310 so that the information is available if the module is used in a different engine at a different point in time.

At block 628, the example database control circuitry 308 queries the engine database 310 to find information that corresponds to the replacement module(s) based on one or more identifiers of the module. For example, if a previously used module was removed from a plane and sent for maintenance and/or refurbishment, the database control circuitry 308 identifies the historical data and static data of the previously used mode that may have been removed from an entry corresponding to an active engine but may still be stored in the engine database 310. Accordingly, if the module is later used in a different engine, the example database control circuitry 308 can identify the entry in the database 310 and utilize the information as part of the engine in which the module is set to be implemented. If the example database control circuitry 308 finds an entry corresponding to the replacement module in the database 310, then the information corresponding to the replacement module is added to the entry of the engine in the example database 310. If the example database control circuitry 308 does not find an entry corresponding to the replacement module in the database 310, then the module is new and the information for the module in the engine entry is initialized as a new entry in the example database 310.

If the example database control circuitry 308 determines that the information related to the replacement module(s) are found (block 630: YES) because the module was previously used in a different engine, the example database control circuitry 308 adds the static and historical information of the module in the engine entry for the replacement module(s) (block 632). The static and/or historical information may include information corresponding to the replacement module(s) in the corresponding entry in the engine database 310. For example, the maintenance information for the replacement module, the maintenance/inspection history for the replacement module, the flight history for the replacement module, a parts list for the replacement module, manufacturer information for the module, a timestamp of the replacement, etc. Thus, the entry for the engine includes all the information of the replacement module. If the example database control circuitry 308 determines that the information related to the replacement module(s) has not been found (block 630: NO) because the module is new, the example database control circuitry 308 initiates the information for the replacement module in the entry for the engine (block 632). For example, the example database control circuitry 308 includes any obtained static information corresponding to the new module and initiates the historical information to zero.

At block 636, the example interface 306 obtains the new identifier(s) from the new RFID tags for the modules of the engine 102. As described above, after each flight, the RFID tags for the high temperature modules are damaged. Accordingly, during maintenance and/or inspection, the RFID tags are replaced for the modules (e.g., even modules that are not replaced) and the identifier corresponding to each module changes during every maintenance/inspection. Thus, new identifiers will be obtained for every module (e.g., old modules and new modules). At block 638, the example database control circuitry 308 updates the identifier information for the modules(s) of the engine 102 based on the new obtained identifiers while maintaining the historic data and static data so that the modules can be tracked even when the identifier is everchanging.

Figure 7:
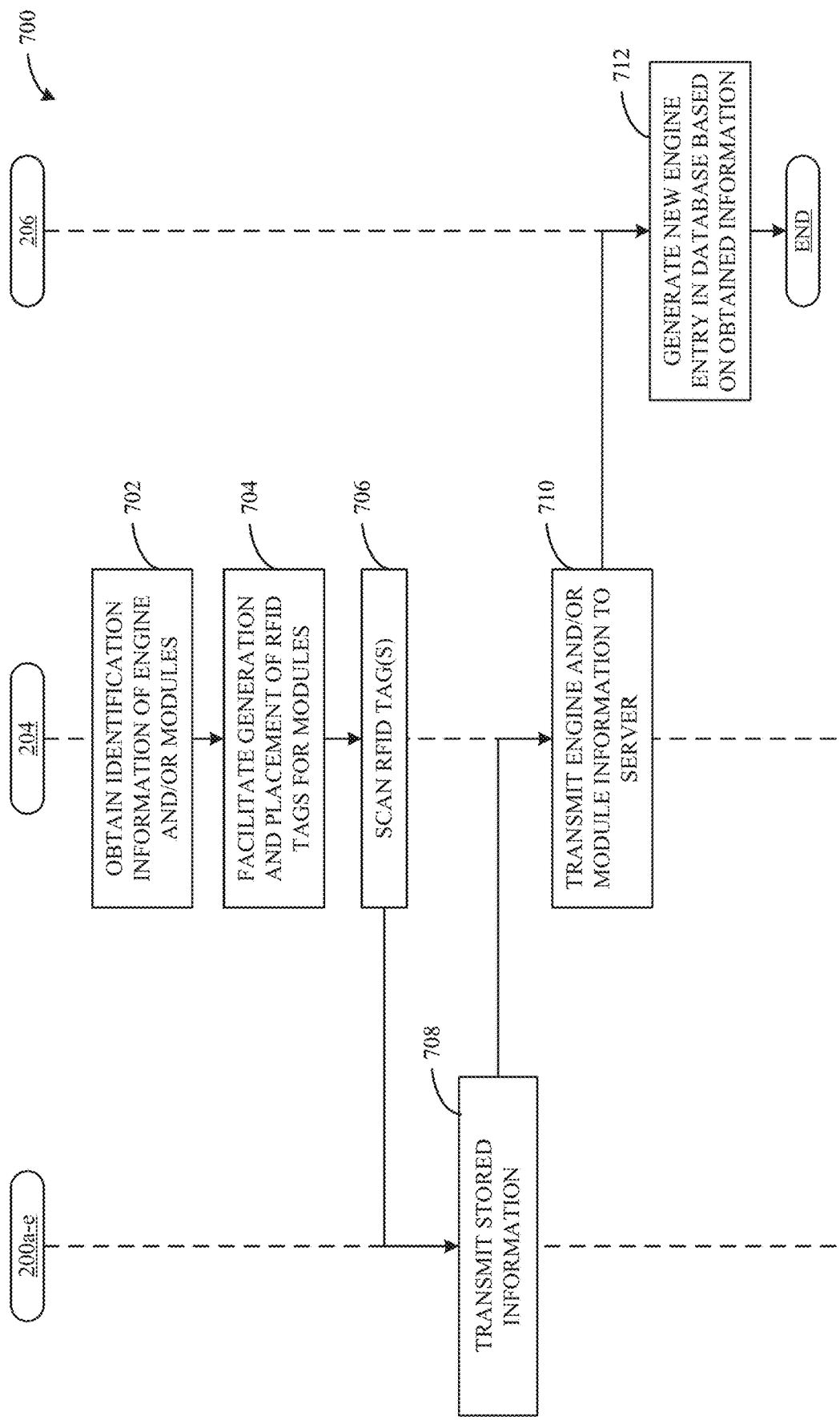
FIGS. 7 and 8 are flowcharts representative of example machine readable instructions that may be executed by example processor circuitry to implement the example RFID tags, the example computing device, and the example could-based server of FIGS. 2 and/or 3.

FIG. 7 is a communication flowchart representative of example machine readable instructions 700 which may be executed to by the RFID tags 200a-200e-2, the computing device 204, and the cloud-based server 206 during assembly of a new engine. Although the instructions 700 are described in conjunction with the RFID tags 200a-200e-2, the computing device 204, and the cloud-based server 206 of FIGS. 2 and/or 3, the instructions 700 may be described in conjunction with any type of tag, computing device, and/or server.

At block 702, the example computing device 204 obtains information corresponding to the engine 102 and/or the modules 108, 116, 118, 120, 124 that make up the engine 102. The information may be identification information and/or any other static information related to the engine 102 and/or the modules 108, 116, 118, 120, 124. At block 704, the example computing device 204 facilitates the generation and/or placement of the RFID tags for the modules. As described above, the RFID tags are placed on each module and include identifiers and/or static information related to the RFID tag. Additionally, duplicate RFID tags of the tags on the high temperature modules are placed on the fan or booster module 108. At block 706, the example computing device 204 scans the RFID tag(s) on the modules to obtain and/or verify the information stored in the RFID tags.

At block 708, the example RFID tags 200a-200e-2 transmit the stored information to the example computing device 204. At block 710, the example computing device 204 transmits the engine and/or module information to the example cloud-based server 206. The cloud-based server 206 uses the information to track the engine 102 and/or the modules 108, 116, 118, 120, 124 that make up the engine 102. At block 710, the example cloud-based server 206 generates a new entry in the engine database 310 based on the obtained information.

Figure 8:
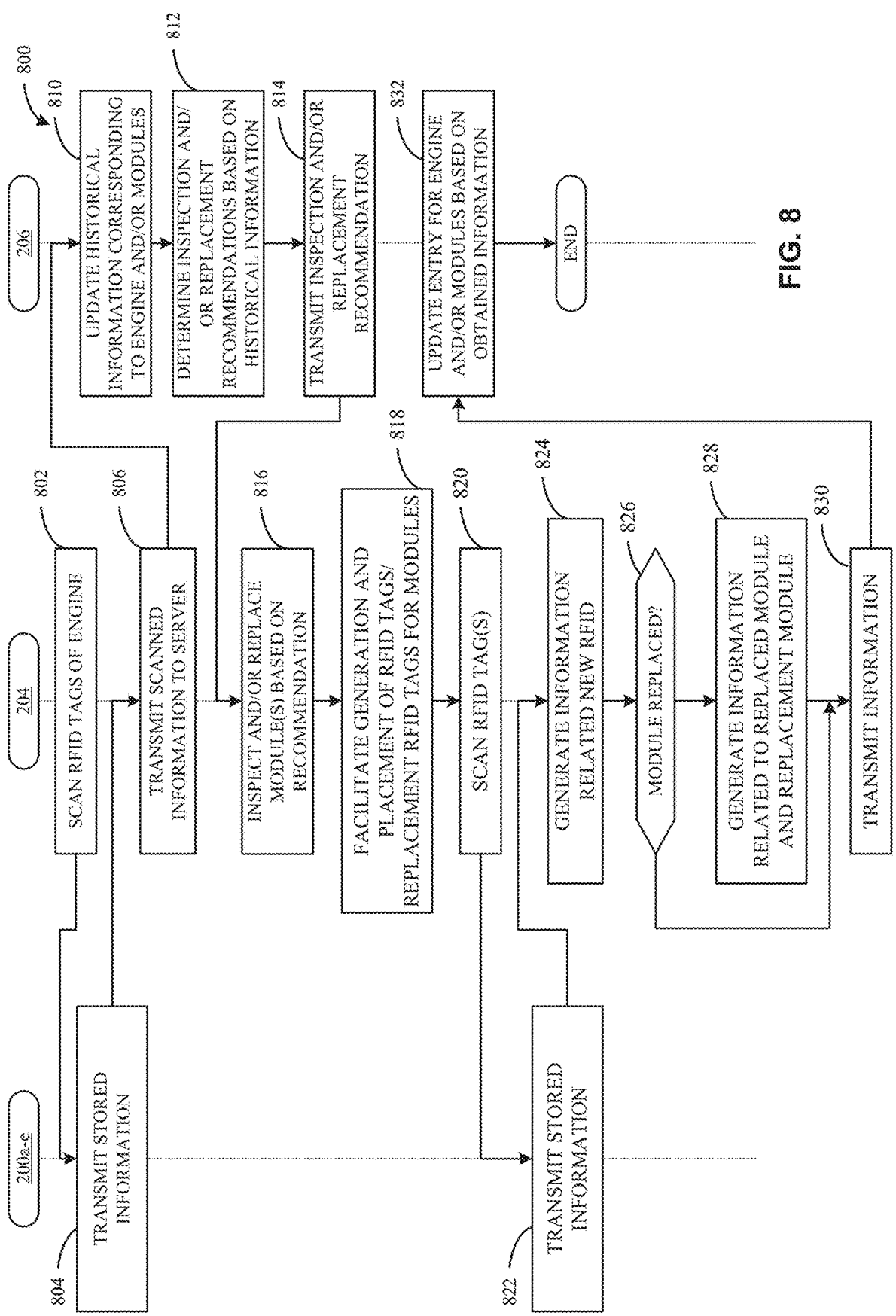

FIG. 8 is a communication flowchart representative of example machine readable instructions 800 which may be executed to by the RFID tags 200a-200e-2, the computing device 204, and the cloud-based server 206 track modules during inspection and/or maintenance. Although the instructions 800 are described in conjunction with the RFID tags 200a-200e-2, the computing device 204, and the cloud-based server 206 of FIGS. 2 and/or 3, the instructions 800 may be described in conjunction with any type of tag, computing device, and/or server.

At block 802, the example computing device scans the RFID tags of the engine 102 (e.g., the RFID tags on the fab booster module 108) when the engine reaches the location for inspection and/or maintenance. At block 804, the RFID tags 200a-200e-2 transmit the stored information to the computing device 204. At block 806, the example computing device transmits the scanned information to the server 206, thereby allowing the server 206 to determine that the engine 102 has completed one or more flights and is currently being inspected/maintained.

At block 810, the example cloud-based server 206 updates the historical information corresponding to the engine 102 and/or the modules 108, 116, 118, 120, 124 in response to receiving the scanned information. At block 812, the example cloud-based server 206 determines inspection and/or replacement recommendations based on the historical information and the maintenance information of the one or more modules. For example, if the maintenance information for a module states that a module should be replaced after 20 flights, the cloud-based server 206 analyzes the historical information for the module to see if the 20 flight threshold has been reached to generate a replacement recommendation. Additionally, the maintenance information may identify when and/or how to inspect particular parts of the modules.

At block 814, the example cloud-based server 206 transmits the inspection and/or replacement recommendations to the example computing device 204. At block 816, the example computing device inspect and/or replaces the modules(s) based on the recommendation. At block 818, after the modules have been inspected, maintained, replaced, and/or reassembled into the engine 102, the example computing device 204 scans the RFID tag(s) of the engine 102 to obtain new RFID identifiers for the module(s) of the engine 102. At block 822, the example RFID tags 200a-200e-2 transmit the stored information including any identifiers to the computing device 204. At block 824, the example computing device 204 generates information related to the newly obtained RFID tag identifiers.

If the computing device 204 determines that one or more modules has been replaced (block 826: YES), the computing device 204 generates information related to the replaced module and the replacement module (block 828). For example, the computing device 204 includes an indication of the replacement as well as any information (identifiers, statis information, mystical information, etc.) related to the replacement module. At block 830, the example computing device 204 transmits the generated information (e.g., new identifiers and/or replacement module information) to the example cloud-based server 206. At block 832, the example cloud-based server 204 updates the entry for the engine and/or modules based on the obtained information, as described above in conjunction with FIGS. 6A-6B.

Figure 9:
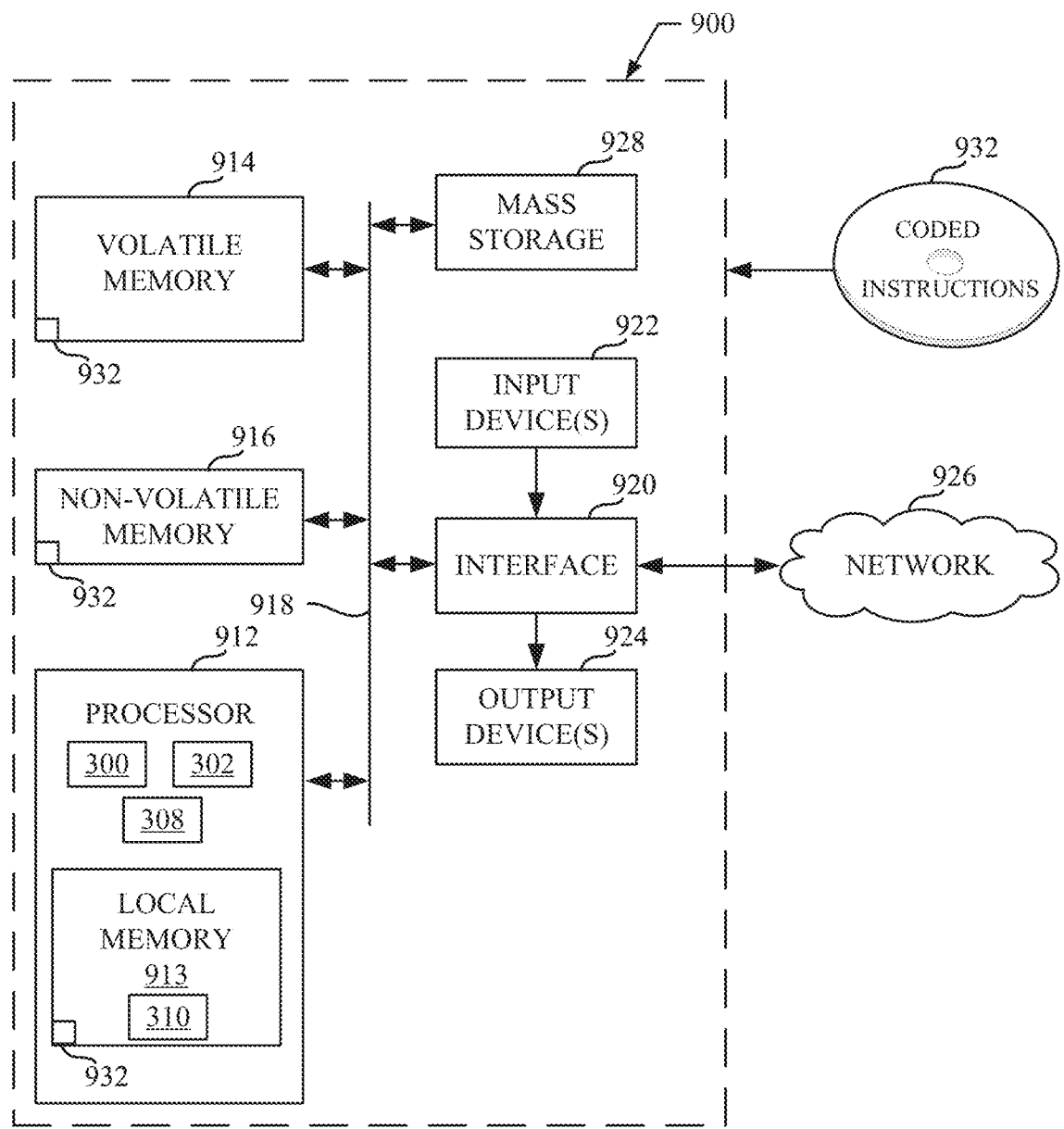
FIG. 9 is a block diagram of an example processing platform including processor circuitry structured to execute the example machine readable instructions of FIGS. 4-8 to implement the example computing device and/or the example cloud-based server of FIGS. 2 and/or 3.

FIG. 9 is a block diagram of an example processor platform 900 structured to execute the instructions of FIGS. 4-8 to implement the example computing device 204 and/or the cloud-based server 206 of FIGS. 2 and/or 3. The processor platform 900 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements at least one of the user interface 304, the instruction determination circuitry 302, and/or the database control circuitry 308 of FIGS. 1 and/or 2.

The processor 912 of the illustrated example includes a local memory 913 (e.g., a cache). In the example of FIG. 9, the local memory 913 implements the example engine database 310 of FIG. 3. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller. Any one of the example volatile memory 914, the example non-volatile memory 916, and/or the example mass storage 928 may implement the example engine database 310.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. The interface 920 may implement the interface(s) 300 and/or the interface 306 of FIG. 3.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 4-8 may be stored in the mass storage device 928, in the volatile memory 914, in the non-volatile memory 916, and/or on a removable non-transitory computer readable storage medium such as a CD or DVD.

Figure 10:
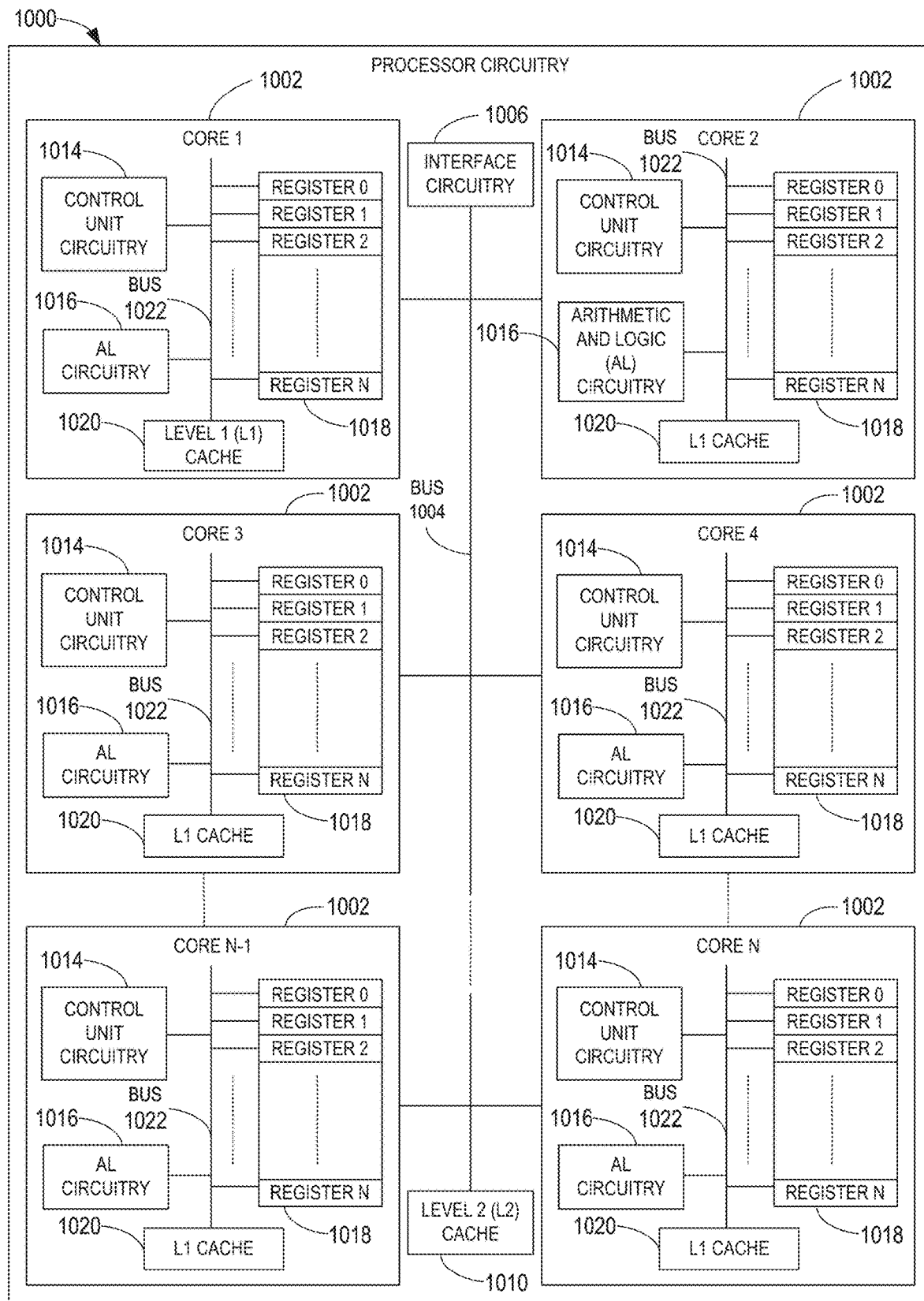
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIG. 4-6B.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1004 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
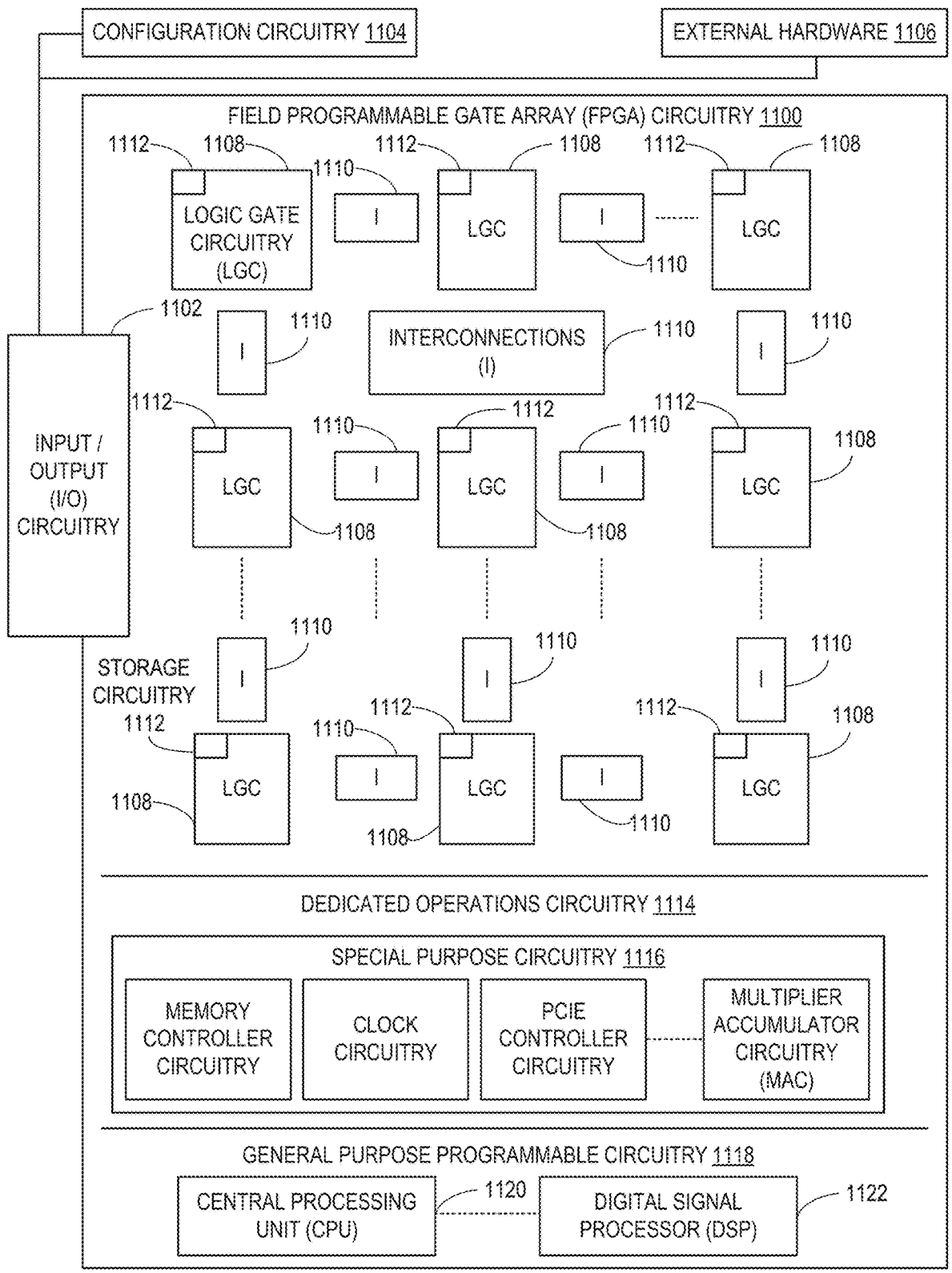
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIGS. 4-6B but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIGS. 4-6B. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIGS. 4-6B. As such, the FPGA circuitry 1100 may be structured to effectively instantiate some or all of the machine readable instructions of the flowchart of FIGS. 4-6B as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4-6B faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 4-6B and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modem FPGA circuitry may include an onboard CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 4-6B may be executed by one or more of the cores 1002 of FIG. 10 and a second portion of the machine readable instructions represented by the flowcharts of FIGS. 4-6B may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Further aspects of the present disclosure are provided by the subject matter of the following clauses:

Example 1 includes an apparatus comprising memory, instructions in the apparatus, and processor circuitry to execute the instructions to in response to a notification that an engine is undergoing maintenance or in operation, identify an entry in a database that corresponds to the engine, the engine including a module, update historical data corresponding to the module based on the notification, and determine whether the module of the engine has been replaced by extracting data from a data packet obtained via a wireless communication, and when the module of the engine has not been replaced, replace a first identifier of the module stored in the entry with a second identifier of the module and maintain the historical data for the module in the entry.

Example 2 includes the apparatus of example 1, wherein the module is a high temperature module, the second identifier is stored in a radio frequency identifier (RFID) tag in the high temperature module and in a low temperature module of the engine.

Example 3 includes the apparatus of example 1, wherein the historical data is stored in a cloud-based server, the historical data including at least one of maintenance data, inspection data, or flight data.

Example 4 includes the apparatus of example 1, wherein the module is a first module and the historical data is first historical data, the processor circuitry to identify whether a second module of the engine should be replaced based on second historical data corresponding to the second module and maintenance information corresponding to the second module.

Example 5 includes the apparatus of example 4, wherein the processor circuitry is to transmit instructions to replace the second module with a third module.

Example 6 includes the apparatus of example 1, wherein the processor circuitry is to, when the module of the engine has been replaced, replace the first identifier of the module stored in the entry with the second identifier of a replacement module and replace the historical data and first static information for the module in the entry stored in a cloud based server with second historical data and second static information corresponding to the replacement module.

Example 7 includes the apparatus of example 1, wherein the processor circuitry is to generate the entry for the engine after the engine is assembled, the entry including data related to modules of the engine.

Example 8 includes the apparatus of example 1, wherein the processor circuitry is to determine whether the module has been replaced during the maintenance by querying the database using the second identifier.

Example 9 includes the apparatus of example 1, wherein the processor circuitry is to, when the module of the engine has been modified, replace the first identifier of the module stored in the entry with the second identifier of the module and maintain the historical data for the module in the entry.

Example 10 includes a non-transitory computer readable storage medium comprising instructions which, when executed, cause one or more processors to at least in response to a notification that an engine is undergoing maintenance or in operation, identify an entry in a database that corresponds to the engine, the engine including a module, update historical data corresponding to the module based on the notification, determine whether the module of the engine has been replaced by processing data obtained via a wireless communication, and when the module of the engine has not been replaced, replace a first identifier of the module stored in the entry with a second identifier of the module and maintain the historical data for the module in the entry.

Example 11 includes the computer readable storage medium of example 10, wherein the module is a high temperature module, the second identifier is stored in a radio frequency identifier (RFID) tag in the high temperature module and in a low temperature module of the engine.

Example 12 includes the computer readable storage medium of example 10, wherein the historical data is stored in a cloud-based server, the historical data including at least one of maintenance data, inspection data, or flight data.

Example 13 includes the computer readable storage medium of example 10, wherein the module is a first module and the historical data is first historical data, the instructions to cause the one or more processors to identify whether a second module of the engine should be replaced based on second historical data corresponding to the second module and maintenance information corresponding to the second module.

Example 14 includes the computer readable storage medium of example 13, wherein the instructions cause the one or more processors to transmit instructions to replace the second module with a third module.

Example 15 includes the computer readable storage medium of example 10, wherein the instructions cause the one or more processors to, when the module of the engine has been replaced, replace the first identifier of the module stored in the entry with the second identifier of a replacement module and replace the historical data and first static information for the module in the entry with second historical data and second static information corresponding to the replacement module.

Example 16 includes the computer readable storage medium of example 10, wherein the instructions cause the one or more processors to generate the entry for the engine after the engine is assembled, the entry including data related to modules of the engine.

Example 17 includes the computer readable storage medium of example 10, wherein the instructions cause the one or more processors to determine whether the module has been replaced during the maintenance by querying the database using the second identifier.

Example 18 includes the computer readable storage medium of example 10, wherein the instructions cause the one or more processors to, when the module of the engine has been modified, replace the first identifier of the module stored in the entry with the second identifier of the module and maintain the historical data for the module in the entry.

Example 19 includes a method comprising in response to a notification that an engine is undergoing maintenance or in operation, identifying, by executing an instruction with a processor, an entry in a database that corresponds to the engine, the engine including a module, updating, by executing an instruction with the processor, historical data corresponding to the module based on the notification, determining, by executing an instruction with the processor, whether the module of the engine has been replaced by processing data obtained via a wireless communication, and when the module of the engine has not been replaced, replacing, by executing an instruction with the processor, a first identifier of the module stored in the entry with a second identifier of the module and maintain the historical data for the module in the entry.

Example 20 includes the method of example 19, wherein the module is a high temperature module, the second identifier is stored in a radio frequency identifier (RFID) tag in the high temperature module and in a low temperature module of the engine.

From the foregoing, it will be appreciated that example methods, apparatus, and storage media have been disclosed that track engine components. To be able to track the individual parts and/or components of an engine before the engine is assembled and/or while the engine is disassembled, an identifier may be placed on the modules of the gas turbine engine (e.g., a serial number). However, tracking parts by serial number can be problematic. For example, serial number in high temperature modules(s) may fade with time, making recognition of the serial number different and/or impossible. Additionally, tracking modules based on a user entering a serial number into a system can lead to user error (e.g., entering the wrong serial number), thereby causing inaccurate engine module information. Such inaccurate information can potentially be dangerous. For example, if a user enters an incorrect serial number that is used to track when a module is due to be replaced, a module that does not comply the safety standards may inadvertently be used in an airplane. Such problems can be alleviated using RFID tags to identify modules(s) of an engine. Tracking and/or identifying each module during maintenance and/or operation is important because, during maintenance, an engine may be disassembled and different modules may be provided to different technicians in different locations. A technician may be working on multiple modules at the same time, making it difficult to track which module belongs to which engine when the engine is reassembled without a secure tracking device. However, module(s) that are exposed to high temperatures destroy the RFID tags in the modules. Accordingly, there is no efficient technique for tracking high temperature modules for a fleet of planes that may be interchanged in other engine systems.

Examples disclosed herein provide a cloud-based technique for tracking turbine engines and/or components, parts, modules, LRUs, and/or LLPs of turbine engines using RFID tags, regardless of where the RFID tag is placed (e.g., in high temperature modules or low temperature modules). Examples disclosed herein track part information included identifiers, serial numbers, supplier information, maintenance data, history (e.g., number of flight, hours of use, etc.), etc. to contribute to a flexible system to respond to unknown field issues more efficiently and to provide near real-time information on the components in a fleet of planes. Using examples disclosed herein engine parts (e.g., including high temperature parts) can be tracked, located, monitored, etc. within planes and/or during assembly and/or maintenance/ inspection using a cloud based approach without the risk of losing the identification information of the module (e.g., due to high temperatures). Examples disclosed herein ease engine part maintenance, scheduling, improve manufacturing and maintenance efficiency, etc., resulting in a more efficient and safer use of gas turbine engines.

Although certain example methods, apparatuses and articles of manufacture have been disclosed herein, the scope of coverage of this patent is not limited thereto. On the contrary, this patent covers all methods, apparatuses and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
memory;
instructions in the apparatus; and
processor circuitry to execute the instructions to:
obtain an electronic notification that an engine is undergoing maintenance or in operation via a network communication;
in response to the electronic notification that the engine is undergoing maintenance or in operation, access an entry in a database that corresponds to the engine, the engine including a physical module;
update historical data corresponding to the physical module based on the electronic notification; and
determine whether the physical module of the engine has been replaced by extracting data from a data packet obtained via a network communication; and
based on the physical module of the engine having not been replaced, access the entry in the database to replace a first tag identifier of the physical module stored in the entry with a second tag identifier of the physical module and maintain the historical data for the physical module in the entry, the first tag identifier corresponding to a first wireless tag that was attached to the physical module and the second tag identifier corresponding to a second wireless tag that was added to the physical module after the first wireless tag was removed from the physical module.

2. The apparatus of claim 1, wherein the physical module is a high temperature physical module, the second tag identifier is stored in a radio frequency identifier (RFID) tag in the high temperature physical module and in a low temperature physical module of the engine.

3. The apparatus of claim 1, wherein the historical data is stored in a cloud-based server, the historical data including at least one of maintenance data, inspection data, or flight data.

4. The apparatus of claim 1, wherein the physical module is a first physical module and the historical data is first historical data, the processor circuitry to identify whether a second physical module of the engine should be replaced based on second historical data corresponding to the second physical module and maintenance information corresponding to the second physical module.

5. The apparatus of claim 4, wherein the processor circuitry is to transmit instructions to replace the second physical module with a third physical module.

6. The apparatus of claim 1, wherein the processor circuitry is to, based on the physical module of the engine being replaced, replace the first tag identifier of the physical module stored in the entry with the second tag identifier of a replacement physical module and replace the historical data and first static information for the physical module in the entry stored in a cloud based server with second historical data and second static information corresponding to the replacement physical module.

7. The apparatus of claim 1, wherein the processor circuitry is to generate the entry for the engine after the engine is assembled, the entry including data related to physical modules of the engine.

8. The apparatus of claim 1, wherein the processor circuitry is to determine whether the physical module has been replaced during the maintenance by querying the database using the second tag identifier.

9. The apparatus of claim 1, wherein the processor circuitry is to, after the physical module of the engine has been modified, replace the first tag identifier of the physical module stored in the entry with the second tag identifier of the physical module and maintain the historical data for the physical module in the entry.

10. The apparatus of claim 1, wherein the physical module includes at least one of a compressor of the engine, a combustor of the engine, or a turbine of the engine.

11. The apparatus of claim 1, wherein the processor circuitry is to:
  obtain a second electronic notification that a second engine is undergoing maintenance;
  in response to the second electronic notification that the second engine is undergoing maintenance, access the entry in the database that corresponds to the engine, the second engine including the physical module; and
  output a maintenance indication to a device that transmitted the second electronic notification based on the historical data corresponding to the physical module.

12. A non-transitory computer readable storage medium comprising instructions which, when executed, cause one or more processors to at least:
  obtain an electronic notification that an engine is undergoing maintenance or in operation via a network communication;
  in response to the electronic notification that the engine is undergoing maintenance or in operation, access an entry in a database that corresponds to the engine, the engine including a physical module;
  update historical data corresponding to the physical module based on the electronic notification;
  determine whether the physical module of the engine has been replaced by processing data obtained via a network communication; and
  based on the physical module of the engine not being replaced, access the entry in the database to replace a first tag identifier of the physical module stored in the entry with a second tag identifier of the physical module and maintain the historical data for the physical module in the entry, the first tag identifier corresponding to a first wireless tag that was attached to the physical module and the second tag identifier corresponding to a second wireless tag that was added to the physical module after the first wireless tag was removed from the physical module.

13. The computer readable storage medium of claim 12, wherein the physical module is a high temperature physical module, the second tag identifier is stored in a radio frequency identifier (RFID) tag in the high temperature physical module and in a low temperature physical module of the engine.

14. The computer readable storage medium of claim 12, wherein the historical data is stored in a cloud-based server, the historical data including at least one of maintenance data, inspection data, or flight data.

15. The computer readable storage medium of claim 12, wherein the physical module is a first physical module and the historical data is first historical data, the instructions to cause the one or more processors to identify whether a second physical module of the engine should be replaced based on second historical data corresponding to the second physical module and maintenance information corresponding to the second physical module.

16. The computer readable storage medium of claim 15, wherein the instructions cause the one or more processors to transmit instructions to replace the second physical module with a third physical module.

17. The computer readable storage medium of claim 12, wherein the instructions cause the one or more processors to, after the physical module of the engine has been replaced, replace the first tag identifier of the physical module stored in the entry with the second tag identifier of a replacement physical module and replace the historical data and first static information for the physical module in the entry with second historical data and second static information corresponding to the replacement physical module.

18. The computer readable storage medium of claim 12, wherein the instructions cause the one or more processors to generate the entry for the engine after the engine is assembled, the entry including data related to physical module s of the engine.

19. A method comprising:
  obtaining an electronic notification that an engine is undergoing maintenance or in operation via a network communication;
  in response to the electronic notification that the engine is undergoing maintenance or in operation, accessing, by executing an instruction with a processor, an entry in a database that corresponds to the engine, the engine including a physical module;
  updating, by executing an instruction with the processor, historical data corresponding to the physical module based on the electronic notification;
  determining, by executing an instruction with the processor, whether the physical module of the engine has been replaced by processing data obtained via a network communication; and
  based on the physical module of the engine having not been replaced, replacing, by executing an instruction with the processor, a first tag identifier of the physical module stored in the database with a second tag identifier of the physical module and maintain the historical data for the physical module in the database, the first tag identifier corresponding to a first wireless tag that was attached to the physical module and the second tag identifier corresponding to a second wireless tag that was added to the physical module after the first wireless tag was removed from the physical module.

20. The method of claim 19, wherein the physical module is a high temperature physical module, the second tag identifier is stored in a radio frequency identifier (RFID) tag in the high temperature physical module and in a low temperature physical module of the engine.

* * * * *